(12) United States Patent
Myrhum et al.

(10) Patent No.: US 12,716,446 B2
(45) Date of Patent: Aug. 25, 2026

(54) CLEVIS PIN ARRANGEMENT FOR A TOOL

(71) Applicant: Milwaukee Electric Tool Corporation, Brookfield, WI (US)

(72) Inventors: James Myrhum, Brookfield, WI (US); William Kreutter, Brookfield, WI (US); Hong Shou Luo, Brookfield, WI (US); Michael Fink, Brookfield, WI (US); Mathew R. Rentmeester, Wauwatosa, WI (US); Brian J. Hyde, Brookfield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 1028 days.

(21) Appl. No.: 17/353,646

(22) Filed: Jun. 21, 2021

(65) Prior Publication Data

US 2021/0396260 A1 Dec. 23, 2021

Related U.S. Application Data

(60) Provisional application No. 63/041,227, filed on Jun. 19, 2020.

(51) Int. Cl.

| | |
|---|---|
| ***B23P 19/027*** | (2006.01) |
| ***B21D 39/04*** | (2006.01) |
| ***F16B 21/12*** | (2006.01) |

(52) U.S. Cl.
CPC .......... *F16B 21/125* (2013.01); *B21D 39/048* (2013.01); *B23P 19/027* (2013.01); *Y10T 403/32893* (2015.01)

(58) Field of Classification Search
CPC ........... Y10T 403/32893; B23P 19/027; B25B 27/10; B26D 5/12
See application file for complete search history.

(56) References Cited

U.S. PATENT DOCUMENTS

| | | | | |
|---|---|---|---|---|
| 3,343,424 | A | 9/1967 | Green | |
| 3,760,676 | A | 9/1973 | Daniels | |
| 5,028,217 | A | 7/1991 | Miller | |
| 5,169,168 | A * | 12/1992 | Harry | B60D 1/07 403/349 |
| 5,472,322 | A | 12/1995 | Huet et al. | |
| 7,814,827 | B2 | 10/2010 | Frenken et al. | |
| 8,251,157 | B2 | 8/2012 | Gray et al. | |
| 8,266,991 | B2 | 9/2012 | Thorson et al. | |
| 8,276,430 | B2 | 10/2012 | Barezzani et al. | |
| 8,683,704 | B2 | 4/2014 | Scott et al. | |
| 8,763,257 | B2 | 7/2014 | Thorson et al. | |

(Continued)

FOREIGN PATENT DOCUMENTS

| | | | |
|---|---|---|---|
| CN | 202997812 | U | 6/2013 |
| EP | 1921346 | A1 | 5/2008 |

(Continued)

*Primary Examiner* — Michael P Ferguson
(74) *Attorney, Agent, or Firm* — Quarles & Brady LLP

(57) ABSTRACT

Embodiments of the invention provide a clevis pin arrangement for use in a tool. The clevis pin arrangement can include a clevis that includes a first and second leg with first and second apertures, respectively, a clevis pin that extends between the first and second apertures when in a closed position, and an actuator. The actuator can move the clevis pin arrangement between the closed position and an open position.

14 Claims, 23 Drawing Sheets

(56) References Cited

U.S. PATENT DOCUMENTS

| | | | | |
|---|---|---|---|---|
| 8,851,200 | B2 | 10/2014 | Gray et al. | |
| 8,875,404 | B2 | 11/2014 | Scott et al. | |
| 9,016,317 | B2 | 4/2015 | Myrhum, Jr. | |
| 9,196,881 | B2 | 11/2015 | Gray et al. | |
| 9,272,477 | B2 * | 3/2016 | Kasai | B25B 27/10 |
| 9,302,402 | B2 | 4/2016 | Thorson et al. | |
| 9,481,077 | B2 * | 11/2016 | Bodola | B25B 27/14 |
| 9,484,700 | B2 | 11/2016 | Kehoe | |
| 9,486,864 | B2 | 11/2016 | Luo et al. | |
| 9,486,865 | B2 | 11/2016 | Scott et al. | |
| 9,669,533 | B2 | 6/2017 | Myrhum, Jr. | |
| 9,808,851 | B2 | 11/2017 | Thorson et al. | |
| D805,365 | S | 12/2017 | Ballard et al. | |
| 10,046,470 | B2 | 8/2018 | Thorson et al. | |
| 10,084,277 | B2 * | 9/2018 | Wason | B25B 27/10 |
| 10,093,012 | B2 | 10/2018 | Koski et al. | |
| 10,128,723 | B2 | 11/2018 | Mergener et al. | |
| 10,213,821 | B2 | 2/2019 | Thorson et al. | |
| 10,226,826 | B2 * | 3/2019 | Kehoe | B25B 7/126 |
| 10,265,758 | B2 | 4/2019 | Skinner et al. | |
| 10,270,263 | B2 | 4/2019 | Brozek | |
| 10,312,653 | B2 | 6/2019 | Ballard et al. | |
| 10,339,496 | B2 | 7/2019 | Matson et al. | |
| 10,343,266 | B2 | 7/2019 | Theiler et al. | |
| 10,380,883 | B2 | 8/2019 | Matson et al. | |
| 10,428,843 | B2 | 10/2019 | Ballard et al. | |
| 10,498,195 | B2 | 12/2019 | Mergener et al. | |
| 10,618,151 | B2 | 4/2020 | Kanack et al. | |
| 10,700,575 | B2 | 6/2020 | Hessenberger et al. | |
| 2002/0076266 | A1 * | 6/2002 | Mandon | A63C 11/221 403/102 |
| 2005/0011236 | A1 * | 1/2005 | Frenken | F16B 21/04 70/1 |
| 2007/0003392 | A1 | 1/2007 | Frenken et al. | |
| 2008/0069663 | A1 | 3/2008 | Frenken et al. | |
| 2009/0229842 | A1 | 9/2009 | Gray et al. | |
| 2010/0000288 | A1 | 1/2010 | Barezzani et al. | |
| 2010/0088898 | A1 | 4/2010 | Thorson et al. | |
| 2010/0325894 | A1 | 12/2010 | Scott et al. | |
| 2011/0005083 | A1 | 1/2011 | Scott et al. | |
| 2011/0005084 | A1 | 1/2011 | Thorson et al. | |
| 2012/0318546 | A1 | 12/2012 | Gray et al. | |
| 2013/0008031 | A1 | 1/2013 | Thorson et al. | |
| 2013/0097873 | A1 | 4/2013 | Luo et al. | |
| 2014/0034159 | A1 | 2/2014 | Myrhum, Jr. | |
| 2014/0173907 | A1 | 6/2014 | Scott et al. | |
| 2014/0182137 | A1 | 7/2014 | Liu et al. | |
| 2015/0014008 | A1 | 1/2015 | Gray et al. | |
| 2015/0217438 | A1 | 8/2015 | Myrhum, Jr. | |
| 2016/0099533 | A1 | 4/2016 | Kehoe | |
| 2016/0214265 | A1 | 7/2016 | Thorson et al. | |
| 2016/0252112 | A1 | 9/2016 | Kehoe et al. | |
| 2016/0288193 | A1 | 10/2016 | Thorson et al. | |
| 2016/0329674 | A1 | 11/2016 | Ballard et al. | |
| 2016/0363510 | A1 | 12/2016 | Kanack et al. | |
| 2016/0364687 | A1 | 12/2016 | Matson et al. | |
| 2016/0373457 | A1 | 12/2016 | Matson et al. | |
| 2017/0013740 | A1 | 1/2017 | Mergener et al. | |
| 2017/0271893 | A1 | 9/2017 | Brozek | |
| 2017/0355027 | A1 | 12/2017 | D'Antuono | |
| 2017/0356472 | A1 | 12/2017 | Ballard et al. | |
| 2018/0021840 | A1 | 1/2018 | Thorson et al. | |
| 2018/0085903 | A1 | 3/2018 | Wackwitz et al. | |
| 2018/0085909 | A1 | 3/2018 | Koski et al. | |
| 2018/0093319 | A1 | 4/2018 | Skinner et al. | |
| 2018/0099388 | A1 | 4/2018 | Koski et al. | |
| 2018/0147618 | A1 | 5/2018 | Skinner et al. | |
| 2018/0281272 | A1 | 10/2018 | Dickert et al. | |
| 2018/0311805 | A1 | 11/2018 | Koski et al. | |
| 2019/0052149 | A1 | 2/2019 | Mergener et al. | |
| 2019/0151967 | A1 | 5/2019 | Kehoe et al. | |
| 2019/0156278 | A1 | 5/2019 | Matson et al. | |
| 2019/0176207 | A1 | 6/2019 | Thorson et al. | |
| 2019/0232481 | A1 | 8/2019 | Skinner et al. | |
| 2019/0260266 | A1 | 8/2019 | Hessenberger et al. | |
| 2019/0318616 | A1 | 10/2019 | Matson et al. | |
| 2020/0001446 | A1 | 1/2020 | Ballard et al. | |
| 2020/0055130 | A1 | 2/2020 | D'Antuono et al. | |
| 2020/0061854 | A1 | 2/2020 | D'Antuono | |
| 2020/0070262 | A1 | 3/2020 | D'Antuono | |
| 2020/0070263 | A1 | 3/2020 | Olbrich | |
| 2020/0147771 | A1 | 5/2020 | Mergener et al. | |
| 2020/0180128 | A1 | 6/2020 | Schneider et al. | |
| 2020/0238487 | A1 | 7/2020 | Kanack et al. | |
| 2020/0261959 | A1 | 8/2020 | Wekwert et al. | |
| 2020/0266684 | A1 | 8/2020 | Hessenberger et al. | |

FOREIGN PATENT DOCUMENTS

| | | | |
|---|---|---|---|
| WO | 89/02532 | A1 | 3/1989 |
| WO | 98/17354 | A1 | 6/1998 |
| WO | 2015/061425 | A1 | 4/2015 |

* cited by examiner 46
10
50
8
98
18
62
22
8
70
78
38
126

34
110
14
42

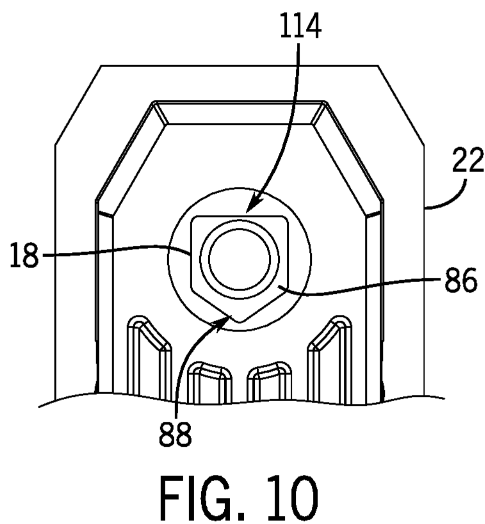
FIG. 10
FIG. 11
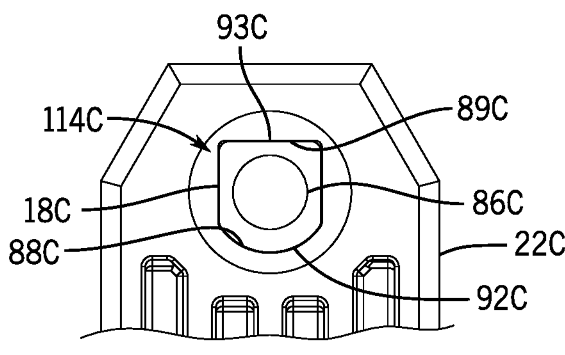
FIG. 12
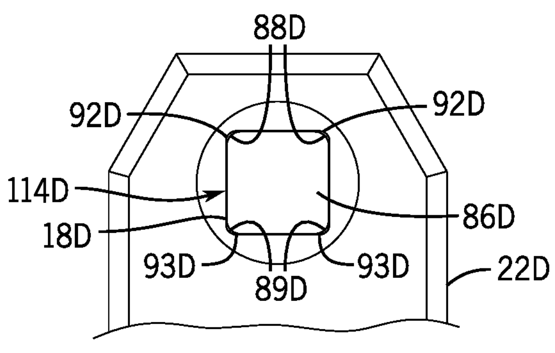
FIG. 13
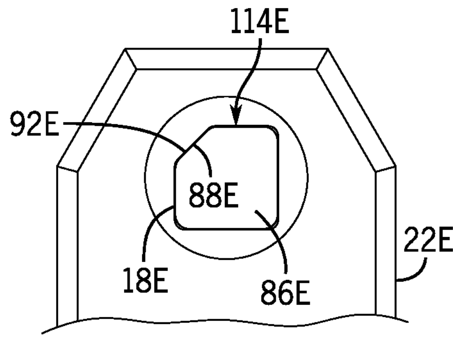
FIG. 14

CLEVIS PIN ARRANGEMENT FOR A TOOL

RELATED APPLICATIONS

This application claims priority to U.S. provisional patent application No. 63/041,227, titled Clevis Pin Arrangement for a Tool and filed Jun. 19, 2020, the entirety of which is incorporated herein by reference.

BACKGROUND

Crimpers and cutters often include a crimping head with opposed jaws that include certain crimping and cutting features, depending on the particular configuration of the tool. Some crimpers and cutters are hydraulic power tools that include a piston that can exert force on the crimping head, which may be used for closing the jaws to perform crimp or compression work at a targeted crimp location. In some cases, it may be useful to remove or install jaws on a crimper or cutter tool.

SUMMARY

Embodiments of the invention provide a clevis pin arrangement for use in a tool. In one embodiment, the clevis pin arrangement includes a clevis with a first leg that includes a first aperture and a second leg that includes a second aperture, a stop pin aperture, and a stop pin positioned in the stop pin aperture. The clevis pin arrangement further includes a clevis pin that includes a first end, an intermediate portion, and a second end, the first end extending into the first aperture and the intermediate portion extending into the second aperture while in a closed position. The first end can be removed from the first aperture while in an open position. The second end includes a stop pin recess. The clevis pin arrangement also includes a clevis lever coupled to the clevis pin that engages a spring. The clevis lever includes a drive aperture receiving the second end of the clevis pin, a lever body, and an inner surface. The inner surface can include a first detent and a second detent. In some embodiments, the spring can bias the second end, the first detent, and the second detent toward the second leg. Rotation of the lever body can cause the first detent to decompress away from the second leg and move the stop pin within the stop pin recess into an intermediate position. Further rotation of the lever body can cause the second detent to decompress away from the second leg and pull the clevis pin out of the first aperture into the open position.

In some embodiments, the clevis pin arrangement includes a first engaging member, a second engaging member that engages the first engaging member, and an actuator that can move relative to the clevis and selectively engage and disengage the first engagement member and the second engagement member.

BRIEF DESCRIPTION OF THE DRAWINGS

The accompanying drawings, which are incorporated in and form a part of this specification, illustrate embodiments of the invention and, together with the description, serve to explain the principles of embodiments of the invention:

FIG. 10 is a partial side view of a clevis pin arrangement including a clevis pin drive and a drive aperture according to an embodiment of the invention.

FIG. 11 is a partial side view of a clevis pin arrangement including a clevis pin drive and a drive aperture according to another embodiment of the invention.

FIG. 12 is a partial side view of a clevis pin arrangement including a clevis pin drive and a drive aperture according to another embodiment of the invention.

FIG. 13 is a partial side view of a clevis pin arrangement including a clevis pin drive and a drive aperture according to another embodiment of the invention.

FIG. 14 is a partial side view of a clevis pin arrangement including a clevis pin drive and a drive aperture according to another embodiment of the invention.

DETAILED DESCRIPTION

Figure 1:
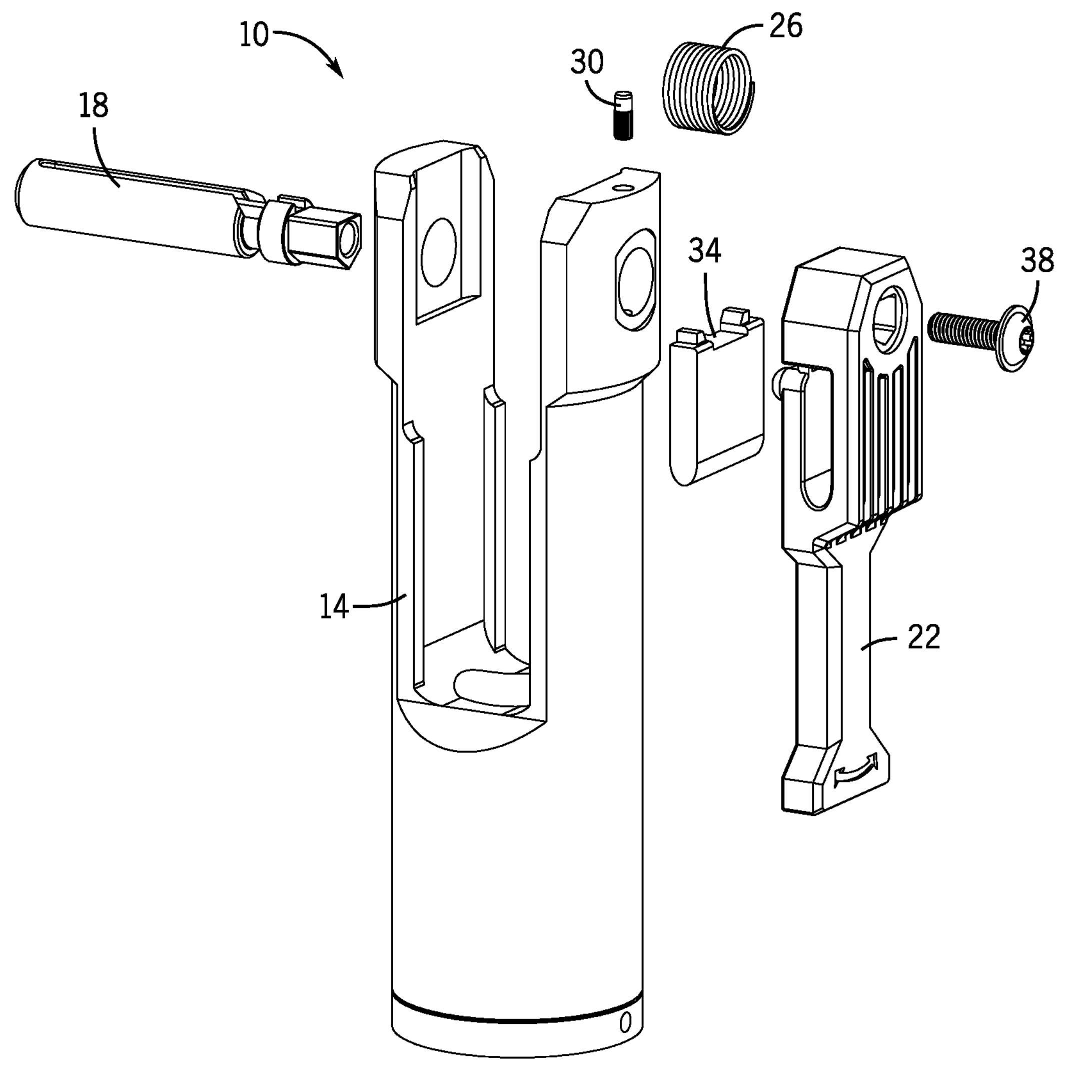
FIG. 1 is an exploded isometric view of a clevis pin arrangement including a clevis, a clevis pin, and a clevis lever according to one embodiment of the invention.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

As used herein, unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

A clevis pin arrangement for use for use with a crimping and cutting tool is described below. It can be generally useful to remove or install jaws in a crimping or cutting tool. For example, a single crimping or cutting tool may be used to complete a variety of tasks; however, varying crimping and cutting jaws may be required. As a result, a clevis pin arrangement that permits removing a set of jaws from the tool and installing a new set of jaws to the tool may be useful to complete different tasks. Additional scenarios where it may be useful to remove or install a set of jaws from a crimper or cutting tool are possible. For example, if there is damage to a set of jaws, it may be useful to remove and discard the damaged jaws and replace the jaws with a functional set of jaws.

FIG. 1 illustrates a clevis pin arrangement 10 according to one embodiment of the invention. In some embodiments, the clevis pin arrangement 10 may be used with a hydraulic hand tool. For example, as will be described in further detail with reference to FIGS. 31 and 32, the clevis pin arrangement 10 may be used with a utility crimper. The clevis pin arrangement 10 is configured to move between a closed position and an open position (see, for examples, FIGS. 7-9). In some embodiments, crimping or cutting jaws may be secured to a crimper or a cutter tool when the clevis pin arrangement 10 is in the closed position. Further, crimping or cutting jaws may be removed from or installed on a crimper or cutter tool when the clevis pin arrangement 10 is in the open position.

As shown in FIG. 1, the clevis pin arrangement 10 includes a clevis 14, a clevis pin 18, and a clevis lever 22. The clevis pin arrangement 10 further includes a spring 26, a stop pin 30, a lever support structure 34 and a fastener 38.

Figure 2:
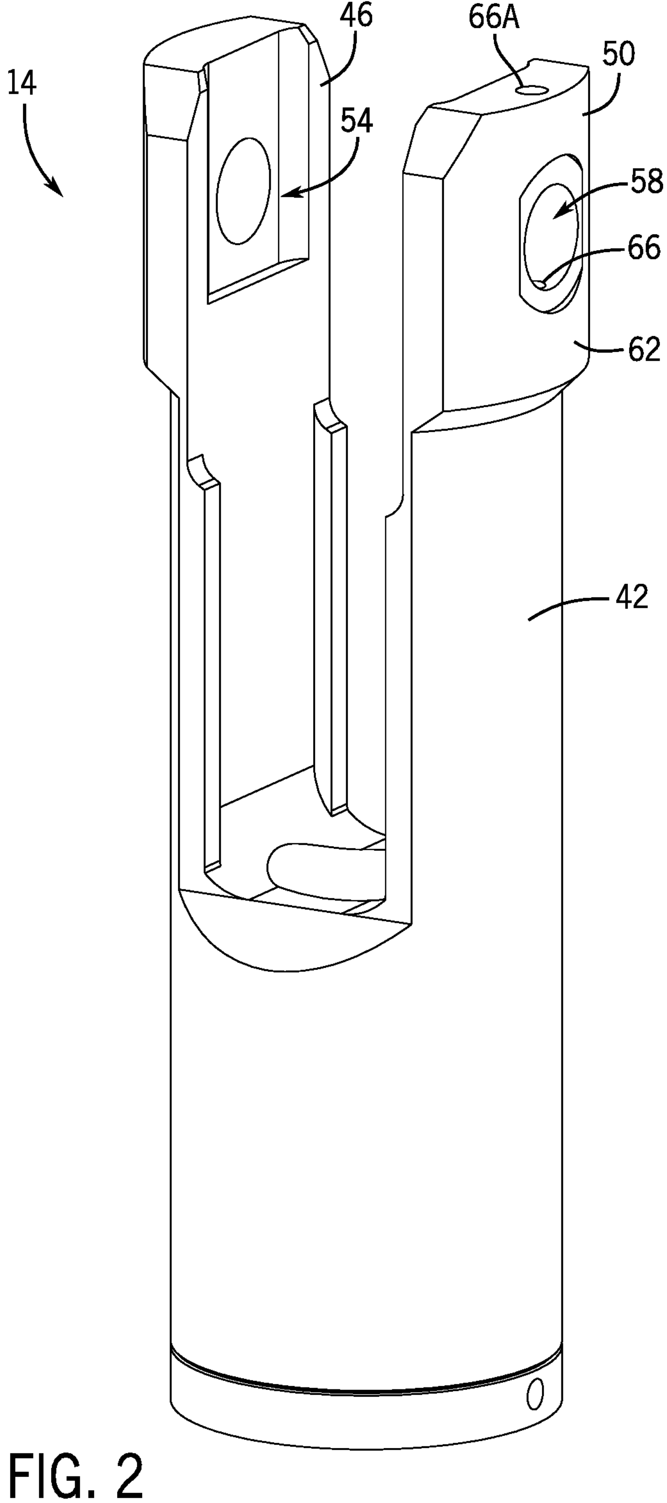
FIG. 2 is an isometric view of the clevis of FIG. 1.

FIG. 2 illustrates the clevis 14 of FIG. 1. The clevis 14 includes a clevis body 42 with a first leg 46 and a second leg 50. Each of the first leg 46 and the second leg 50 include a first aperture 54 and a second aperture 58, respectively. Further, each of the first leg 46 and the second leg 50 include a first outer extending surface (not shown in FIG. 2) and a second outer extending surface 62, respectively. In some embodiments, the second aperture 58 includes a stop pin aperture 66 that extends inside the second leg 50. The second leg 50 includes a stop pin assembly aperture 66A on an outer edge of the second leg 50. In some embodiments, the stop pin assembly aperture 66A may facilitate the installation of a stop pin into the clevis 14. For example, a stop pin may be inserted into the stop pin aperture 66 via the stop pin assembly aperture 66A.

Figure 3:
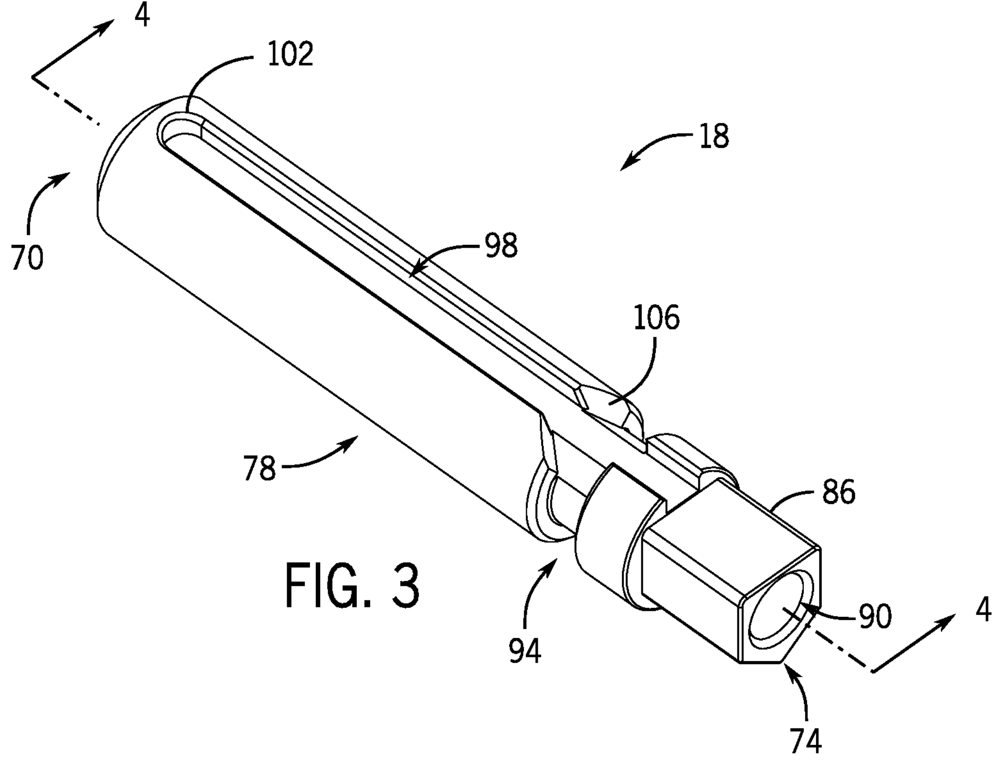
FIG. 3 is an isometric view of the clevis pin of FIG. 1.
Figure 4:
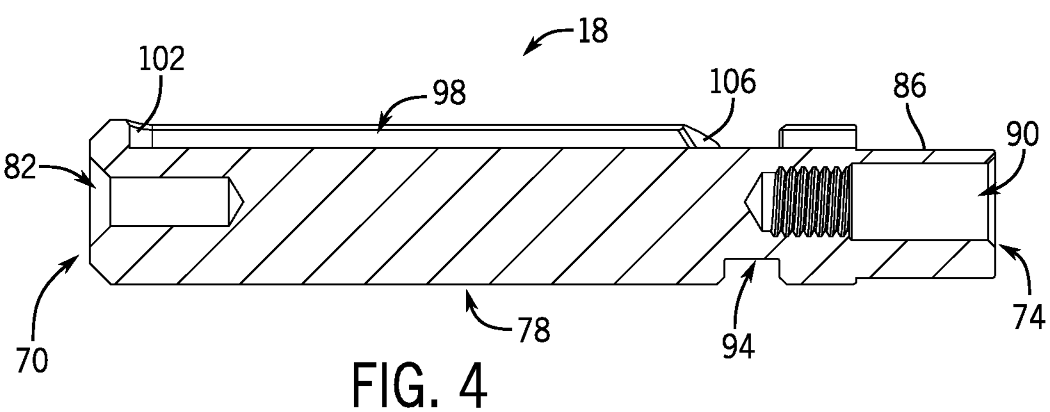
FIG. 4 a cross-sectional side view of the clevis pin taken through line 4-4 of FIG. 3.

FIGS. 3 and 4 illustrate the clevis pin 18 of FIG. 1. The clevis pin 18 includes a first end 70, a second end 74, and an intermediate portion 78. As shown in FIG. 4, in particular, the first end 70 includes a first fastener recess 82. As illustrated in each of FIGS. 3 and 4, the second end 74 includes a drive 86. In the embodiment shown, the drive 86 is a pentagon-shaped drive; however, the drive may be other suitable shapes. Additional examples of drive shapes will be discussed below with reference to FIGS. 10-14. The second end 74 further includes a second fastener recess 90. In some embodiments, as shown in FIG. 4, the second fastener recess 90 may be at least partially internally threaded.

As further illustrated in FIGS. 3 and 4, the intermediate portion 78 includes a stop pin recess 94. In the embodiment shown, the stop pin recess 94 is configured as an annular recess; however, other configurations are possible. For example, the stop pin recess 94 may extend only partially around the circumference of the clevis pin 18. The intermediate portion 78 further includes a stop slot 98 that extends along the intermediate portion 78 and terminates proximate to the first end 70 at a slot end 102. In some embodiments, as illustrated in the cross-sectional view FIG. 4, the stop slot 98 has a depth that extends radially into the clevis pin 18 substantially similar to the depth of the stop pin recess 94. However, in some embodiments, the stop pin recess 94 may extend further into the clevis pin 18 than the stop slot 98 (see, for example, FIG. 22). The intermediate portion 78 further includes a transition chamfer 106 between the stop pin recess 94 and the stop slot 98. The transition chamfer 106 can frame an opening to the stop slot 98.

Figure 5:
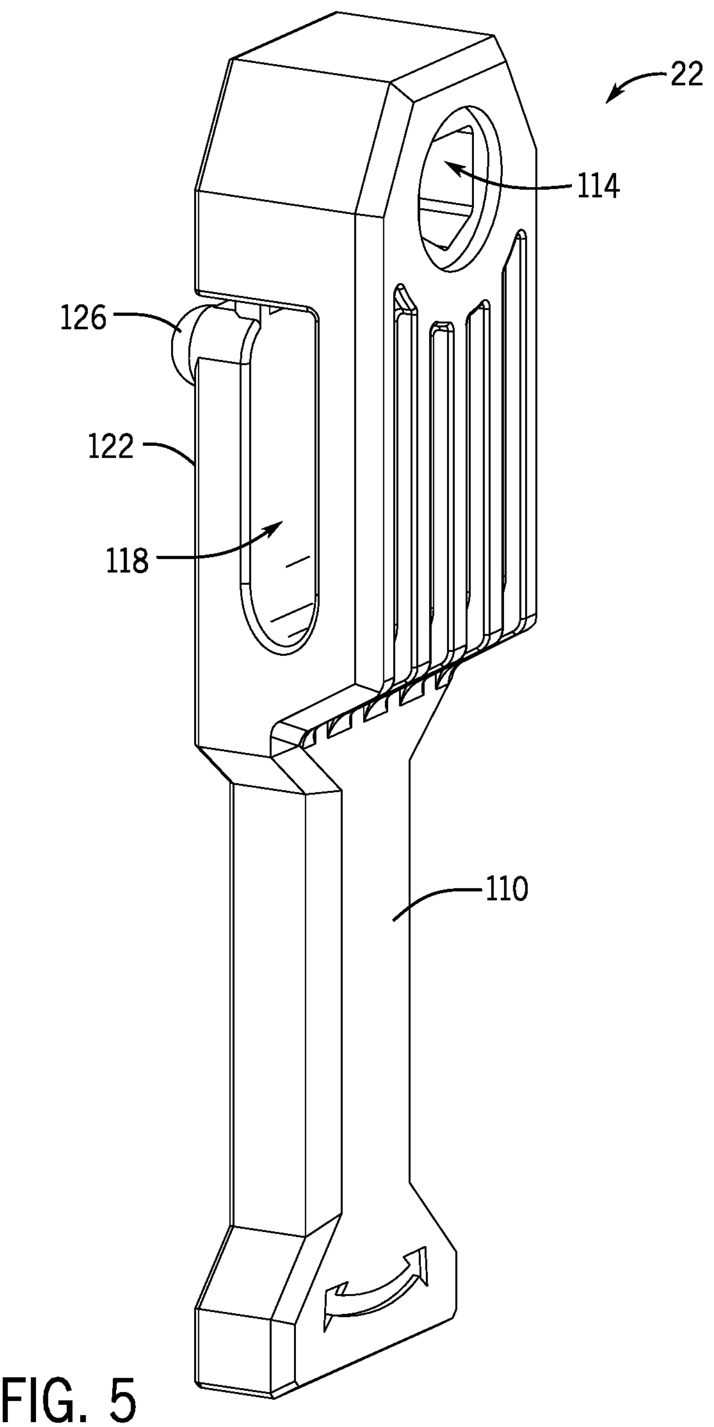
FIG. 5 is an outer side isometric view of the clevis lever of FIG. 1.
Figure 6:
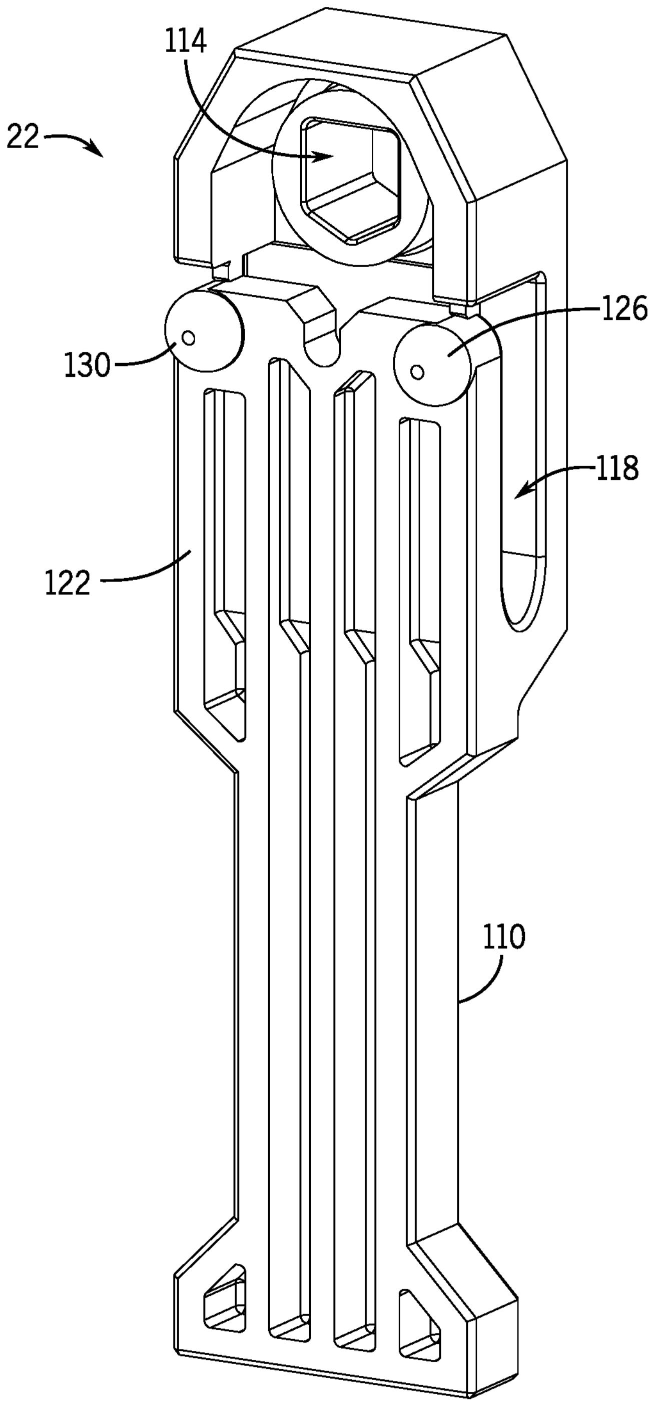
FIG. 6 is an inner side isometric view of the clevis lever of FIG. 1.

FIG. 5 illustrates an outer side of the clevis lever 22 of FIG. 1. The clevis lever 22 includes a lever body 110. In some embodiments, the lever body 110 can include markings to denote directions that the lever body 110 can be rotated. In the example shown, the markings include a doubled sided arcuate arrow. However, other indicia are possible, such as additional or alternative symbols, markings, and words. In general, the clevis lever 22 acts as an actuator to move the clevis pin arrangement 10 between the open position and the closed position. The clevis lever 22 includes a drive aperture 114. As shown, the drive aperture 114 is a pentagon-like shape, similar to the shape of the drive 86 of the clevis pin 18. As mentioned above, additional examples of drives and drive apertures will be described below with reference to FIGS. 10-14. As shown in FIGS. 5 and 6, the clevis lever 22 further includes a lever cavity 118 that is dimensioned to receive the lever support structure 34.

FIG. 6 illustrates an inner side view of the clevis lever 22 of FIG. 1. The clevis lever 22 includes an interior surface 122 that that is disposed outside the lever cavity 118. The interior surface 122 includes a first detent 126 and a second detent 130 that protrude outward from the interior surface 122. In some embodiments, each of the first detent 126 and the second detent 130 may be constructed of a compliable polymer. Additionally, in some embodiments, each of the first detent 126 and the second detent 130 may be integrally formed with the interior surface 122. As shown in FIG. 6, the interior surface 122 includes a hollow rib structure. However, other configurations are possible to provide rigidity and improved manufacturability.

Figure 7:
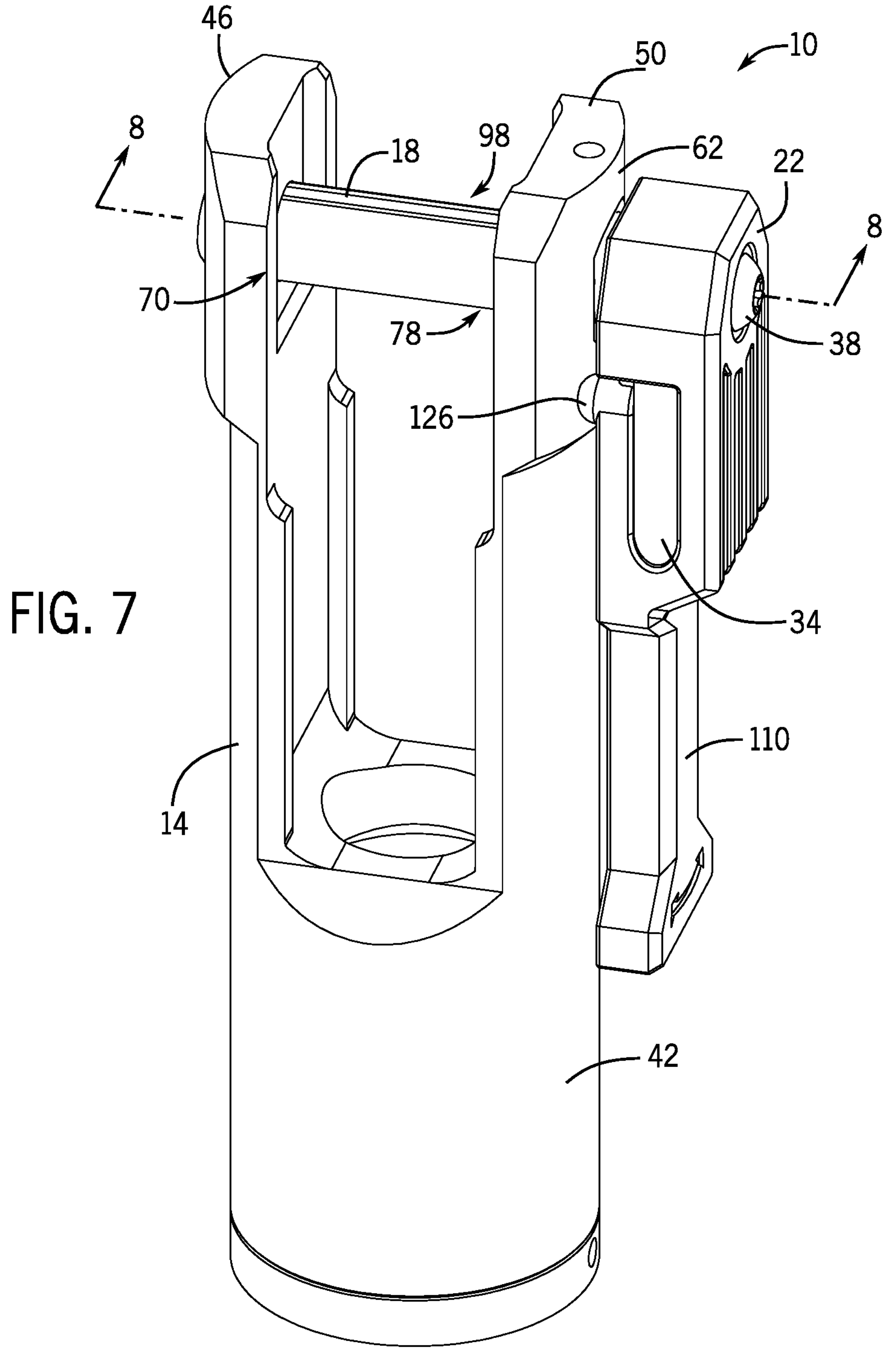
FIG. 7 is an isometric view of the clevis pin arrangement of FIG. 1 in a closed position.

FIG. 7 illustrates the clevis pin arrangement 10 of FIG. 1 in the closed position. As shown, the first end 70 of the clevis pin 18 extends into the first aperture 54 of the clevis 14 and the intermediate portion 78 of the clevis pin 18 extends into the second aperture 58 of the clevis. In the closed position, the lever body 110 extends downward toward the clevis body 42 and the lever support structure 34 is seated in the lever cavity 118.

Figure 8:
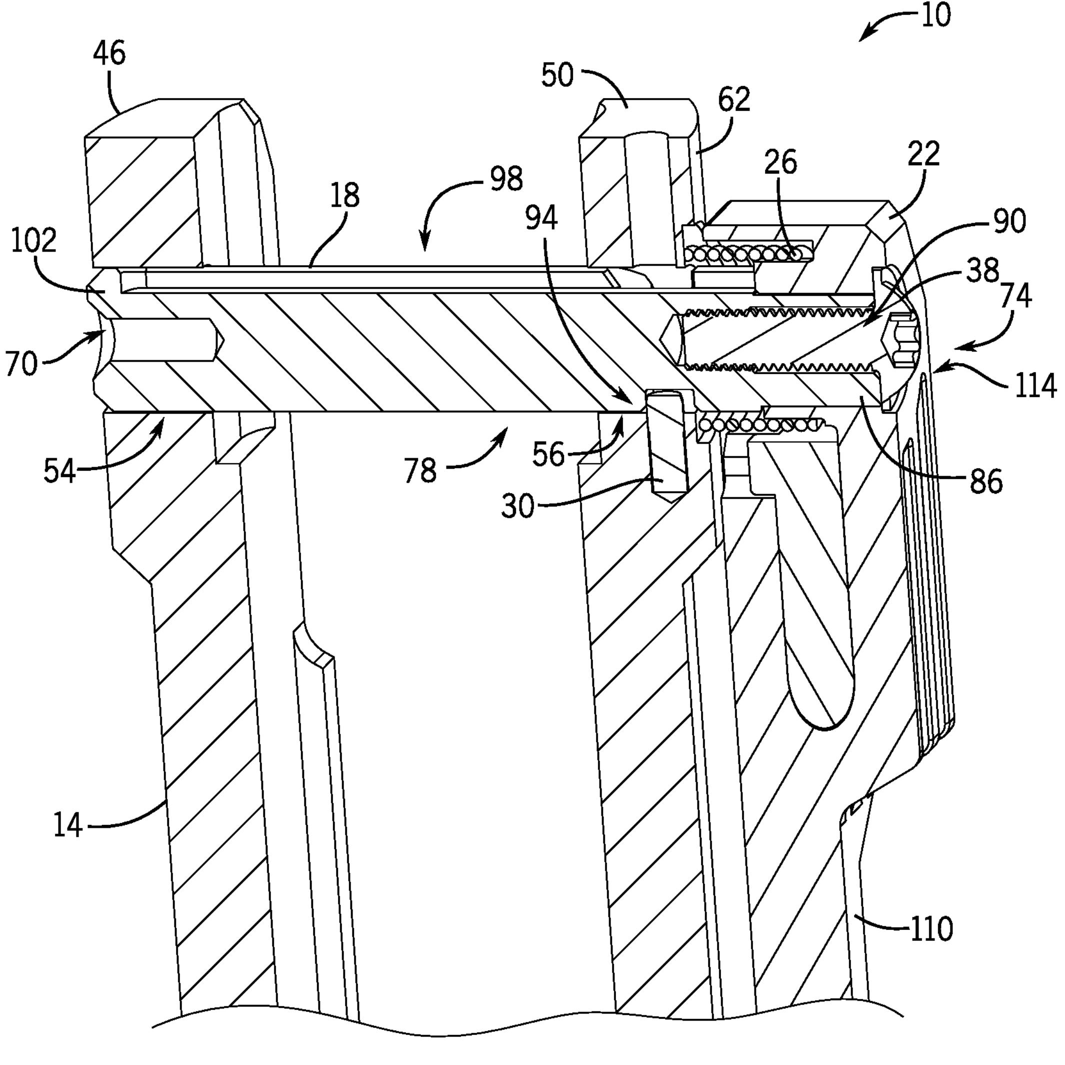
FIG. 8 is a cross-sectional isometric partial view of the clevis pin arrangement taken through line 8-8 of FIG. 7.

FIG. 8 illustrates a cross sectional view of the clevis pin arrangement 10 of FIG. 1. The clevis lever 22 is secured to the clevis pin 18 at the second end 74 via the fastener 38. The fastener 38 extends through the drive aperture 114 and engages the internal threads of the second fastener recess 90 of the clevis pin 18.

In the closed position illustrated in FIGS. 7 and 8, the first detent 126 and the second detent 130 engage the second outer extending surface 62 of the second leg 50 of the clevis 14. The spring 26 biases the second end 74 of the clevis pin 18 and the first and second detents 126, 130 toward the second leg 50. Further, in the closed position, as illustrated in FIG. 8, the stop pin 30 is seated in the stop pin aperture 66 and partially extends into the stop pin recess 94. As shown, in the closed position, the stop pin 30 is substantially 180 degrees from the stop slot 98, thereby preventing axial movement of the clevis pin 18 through the first and second apertures 54, 58 of the clevis 14.

Figure 9:
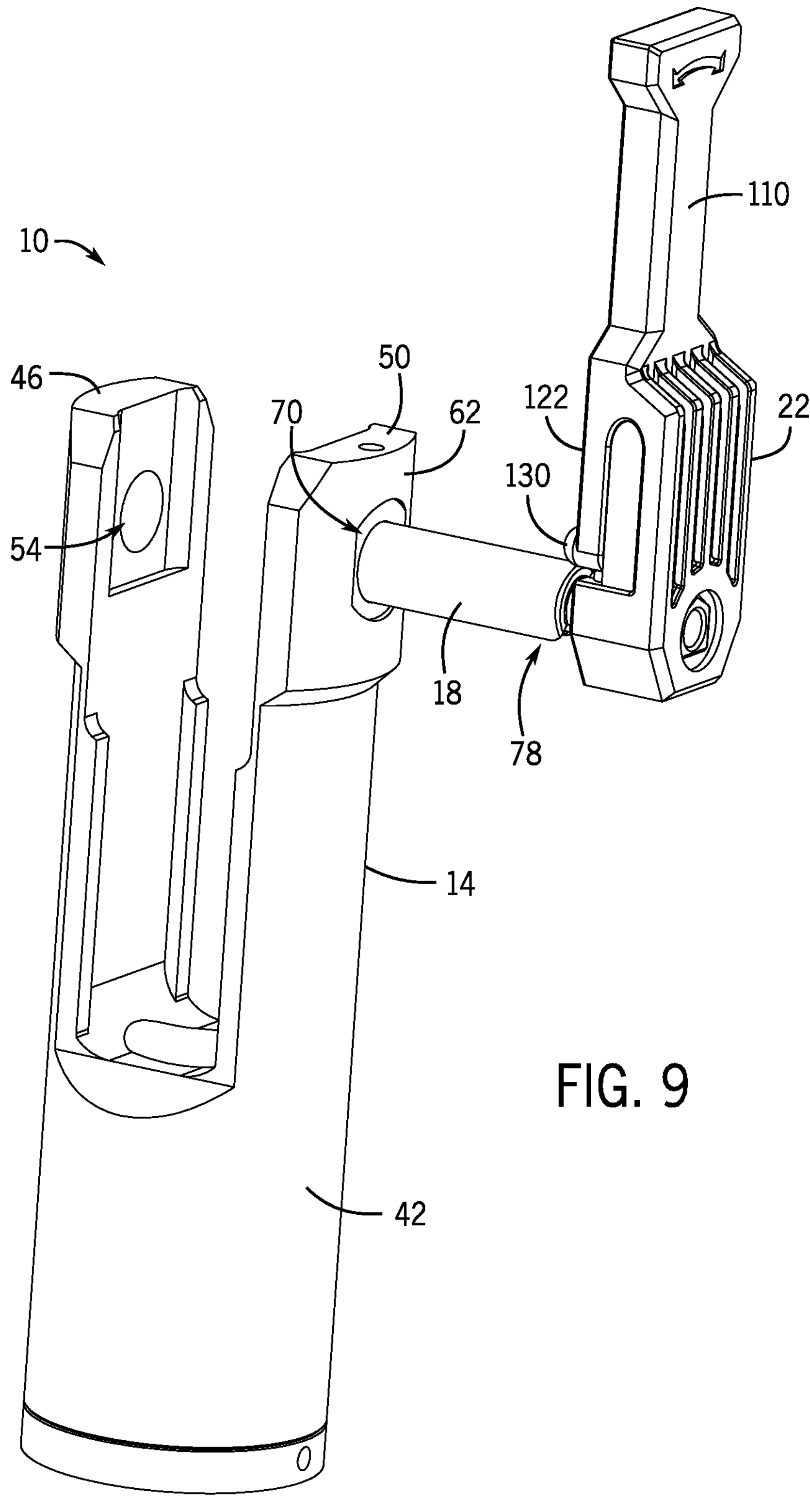
FIG. 9 is a isometric view of the clevis pin arrangement of FIG. 1 in an open position.

FIG. 9 illustrates the clevis pin arrangement 10 of FIG. 1 in the open position. The first end 70 of the clevis pin 18 is removed from the first aperture 54 of the clevis 14. The clevis pin 18 has been axially displaced with respect to the position of the clevis pin 18 in the closed position. Additionally, the clevis lever 22 and the clevis pin 18 are both rotated 180 degrees about a longitudinal axis of the clevis pin 18 as compared to the closed position. In some embodiments, the lever body 110 can be rotated clockwise or counterclockwise to move the clevis lever 22 from the closed position to the open position, and vice versa. In other embodiments, the stop pin recess 94 may permit the clevis lever 22 to rotate in a single direction to open and the opposing direction to close. For example, if the stop pin recess 94 extends only partially around a circumference of the stop pin 30, then the lever body 100 is only allowed to move from the closed position to an open position in a single direction of rotation.

In use, starting from the closed position and a locked orientation, rotation of the lever body 110 causes the first detent 126 to decompress away from the second outer extending surface 62 of the second leg 50 and moves the stop pin recess 94 relative to the stop pin 30. This partial rotation corresponds to an intermediate position where the clevis pin arrangement 10 is not fully open or in the locked orientation. Further rotation of the lever body 110 in the same direction causes the second detent 130 to decompress away from the second outer extending surface 62 of the second leg 50. Depending on the rotation direction of the lever body 110, which in some embodiments, may be rotated clockwise or counterclockwise, the second detent 130 may decompress from the second outer extending surface 62 before the first detent 126.

As the clevis pin 18 rotates within the first and second apertures 54, 58, the transition chamfer 106 approaches the stop pin 30. When the lever body 110 is fully rotated to an unlocked orientation, the transition chamfer 106 provides a guided transition for the stop pin 30 from the stop pin recess 94 to the stop slot 98. When the stop pin 30 is aligned with the stop slot 98, the clevis pin 18, via the clevis lever 22, can be moved axially to slide the stop pin 30 along the stop slot 98 until the stop pin 30 engages the slot end 102 so that the clevis pin 18 and the clevis lever 22 are prevented from being removed from the second aperture 58. In this position, which is illustrated in FIG. 9, the clevis pin 18 and the clevis lever 22 are prevented from rotating by the stop pin 30 engaging side walls of the stop slot 98 and the clevis pin arrangement 10 is in the open position.

FIGS. 10-14 illustrate the drive aperture 114 of the clevis lever 22 having similar shapes to the drive 86 of the clevis pin 18. The drive aperture 114 is dimensioned to receive the drive 86, and rotation of the drive aperture 114 (e.g., via the lever body 110) results in equal rotation of the drive 86 without slippage. In some embodiments, the shape of the drive 86 of the clevis pin 18 may prevent the clevis lever 22 from being secured to the clevis pin 18 in an incorrect orientation, and/or provide a verification of the orientation of the clevis pin 18 relative to the clevis lever 22.

FIG. 10 illustrates the drive 86 of the clevis pin 18 and the drive aperture 114 of the clevis lever 22 of the embodiment shown in FIGS. 1-9. As shown, the pentagon-shaped drive 86 and drive aperture 114 include an obtuse-angled point 88, that, when directed downward, corresponds to a locked position of both the clevis pin 18 and the clevis lever 22. The geometry of each of the drive 86 and the drive aperture 114 allow for a visual and mechanical check that the orientations of the clevis pin 18 and the clevis lever 22 are in sync. As discussed above, alternative drive and drive aperture geometries are possible. The following embodiments, and other suitable geometries not shown, may be used with the clevis pin arrangement 10 shown in FIGS. 1-9. In each of the following embodiments, the clevis levers are substantially similar to the clevis lever 22, and the clevis pins are substantially similar to the clevis pin 18. As such, like reference numbers will be used.

FIG. 11 illustrates a clevis pin 18B that includes a drive 86B, and a clevis lever 22B that includes a drive aperture 114B. The drive 86B includes a notch 88B and the drive aperture 114B includes a corresponding protrusion 92B. The engagement of the notch 88B and the protrusion 92B correspond to the clevis pin 18B and the clevis lever 22B in a secured position while prohibiting alternate arrangements of the drive 86B within the drive aperture 114B. In other embodiments, the notch 88B and the protrusion 92B may be formed at other locations, such as at the bottom of the drive 86B and the drive aperture 114B, respectively, for example.

FIG. 12 illustrates the clevis pin arrangement according to another embodiment of the invention. A clevis pin 18C includes a drive 86C, and a clevis lever 22C includes a drive aperture 114C. The drive 86C includes a rounded edge 88C and a flat edge 89C and the drive aperture 114C includes a corresponding similar rounded edge 92C and a flat edge 93C. The engagement of the rounded edges 88C and 92C of each of the drive 86C and the drive aperture 114C corresponds to the clevis pin 18C and the clevis lever 22B in a secured position, while prohibiting alternate arrangements of the drive 86C within the drive aperture 114C.

FIG. 13 illustrates the clevis pin arrangement according to another embodiment of the invention. A clevis pin 18D includes a drive 86D, and a clevis lever 22D includes a drive aperture 114D. The drive 86D includes a first rounded edge 88D and a second rounded edge 89D having different radii which correspond to the drive aperture 114D that similarly includes a first rounded edge 92D and a second rounded edge 93D having different radii. The engagement of the similarly first rounded edges 88D and 92D and similarly second rounded edge 89D and 93D of the drive 86D and drive aperture 114D, respectively, corresponds to the clevis pin 18D and the clevis lever 22D in a secured position while prohibiting alternate arrangements of the drive 86D within the drive aperture 114D.

FIG. 14 illustrates the clevis pin arrangement according to another embodiment of the invention. A clevis pin 18E includes a drive 86E, and a clevis lever 22E includes a drive aperture 114E. The drive 86E includes an angled section 88E which corresponds to a similar angled section 92E of the drive aperture 114E. The engagement of the similarly angled sections 88E and 92E of the drive 86E and the drive aperture 114E, respectively, corresponds to the clevis pin 18E and the clevis lever 22E in a secured position while prohibiting alternate arrangements of the drive 86E within the drive aperture 114E.

FIGS. 15-30 illustrate additional embodiments of a clevis pin arrangement. Similar to the clevis pin arrangement 10, each of the following embodiments include a clevis, similar to clevis 14, that includes a first leg, a second leg, a first aperture, and a second aperture. Additionally, each of the following embodiments include a clevis pin, similar to clevis pin 18, that extends between the first aperture and the second aperture in a closed position, and is movable between a closed position and an open position.

Figure 15:
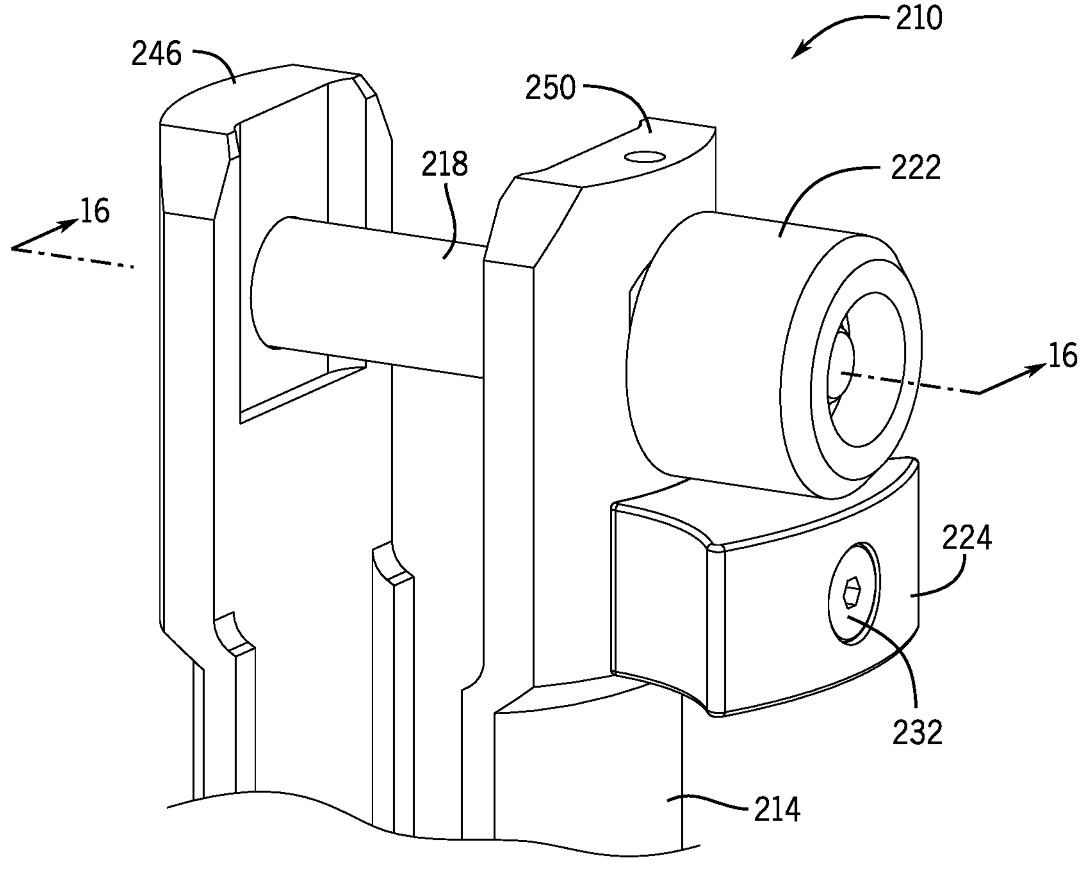
FIG. 15 is an isometric partial view of a clevis pin arrangement including an actuation knob according to another embodiment of the invention.
Figure 16:
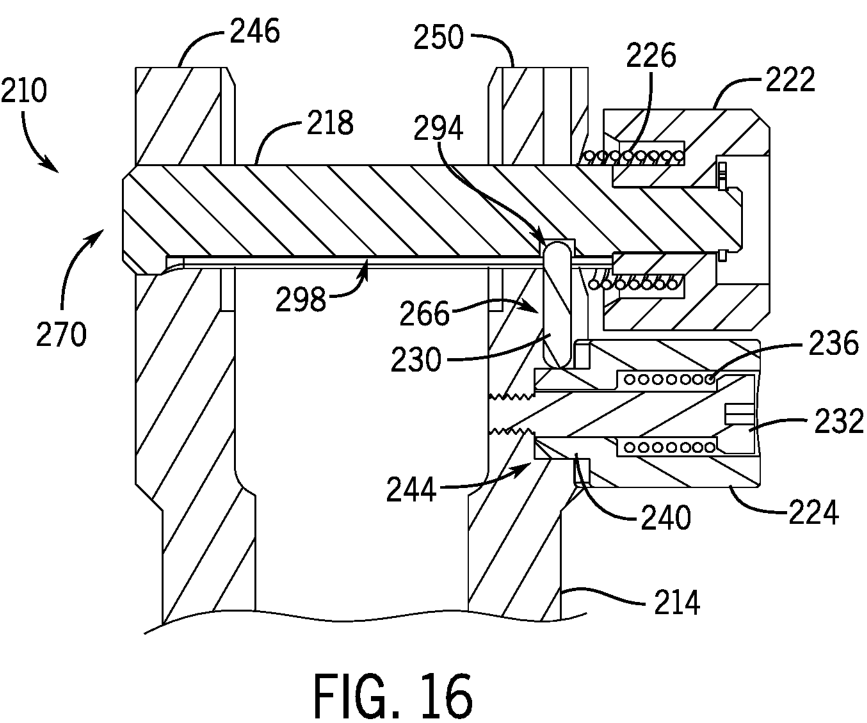
FIG. 16 is a cross-sectional partial side view of the clevis pin arrangement in a closed position taken through 16-16 of FIG. 15.
Figure 17:
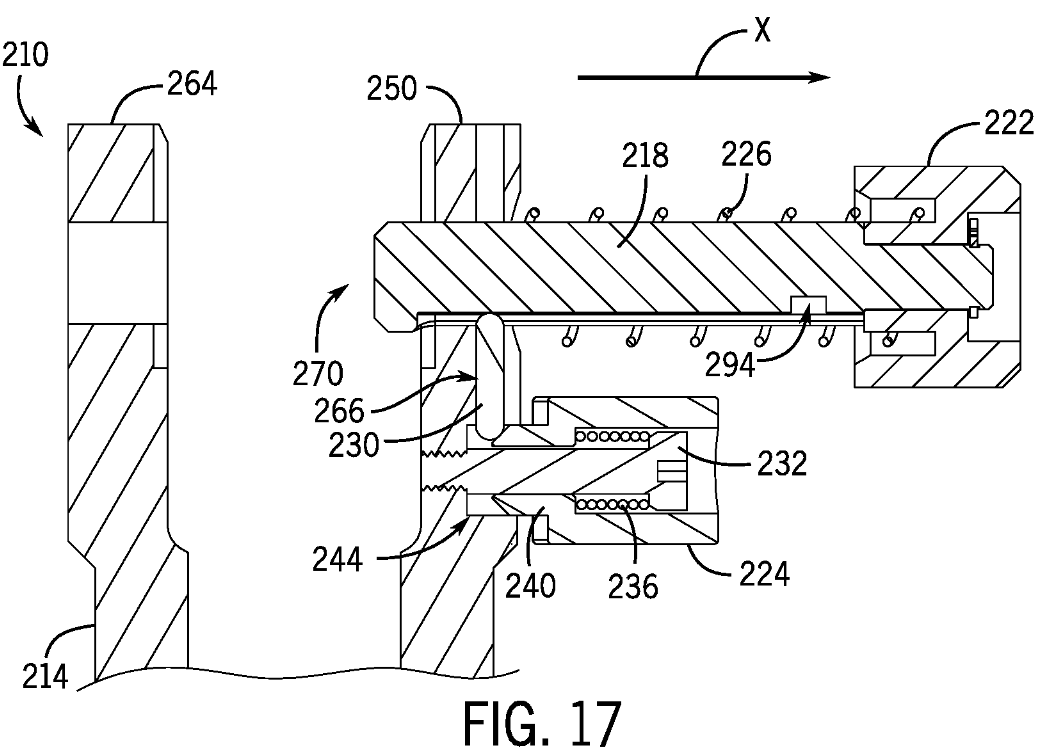
FIG. 17 is a cross-sectional partial side view of the clevis pin arrangement in an open position taken through line 16-16 of FIG. 15.

FIGS. 15-17 illustrate a clevis pin arrangement 210 according to another embodiment of the invention. The clevis pin arrangement 210 includes a clevis 214, a clevis pin 218, and an actuation knob 222 that is secured to the clevis pin 218. The clevis pin arrangement 210 further includes a spring block 224 secured to a second leg 250 of the clevis 214.

As shown in FIG. 16, the clevis pin arrangement 210 includes a first spring 226 within the actuation knob 222 that urges the actuation knob 222 away from the second leg 250, and a stop pin 230 slidable within a stop pin aperture 266 in the second leg 250. The spring block 224 includes a fastener 232 and a second spring 236 that biases the spring block 224 toward the second leg 250. The spring block 224 is translatable along the fastener 232, which is secured to the second leg 250. The spring block 224 further includes a base 240 that can engage the stop pin 230 and extends into a base aperture 244 of the second leg 250 when in a closed position, as illustrated in FIGS. 15 and 16.

In the closed position of the clevis pin arrangement 210, the base 240 urges the stop pin 230 into a stop pin recess 294 of the clevis pin 218. When the actuation knob 222 is rotated, the stop pin 230 is allowed to enter a stop slot 298 of the clevis pin 218. When the stop pin 230 is in the stop slot 298, the clevis pin 218 can be axially (i.e., laterally with respect to the clevis 214) translated via the actuation knob 222 in the direction X of FIG. 17 such that a first end 270 of the clevis pin 218 is moved away from a first leg 246 of the clevis 214 and toward the second leg 250. In some embodiments, to rotate the actuation knob 222, the spring block 224 can be pulled in the direction X relative to the second leg 250 so that the stop pin 230 is allowed to move downward and out of locked engagement with the clevis pin 218.

As illustrated in FIG. 17, when the clevis pin 218 is in the open position, or an intermediate position between the open position and the closed position, the spring block 224 is urged away from the second leg 250 via the stop pin 230. Such displacement of the spring block 224 provides a visual indication that the clevis pin 218 is not in a closed position. Correspondingly, as shown in FIGS. 15 and 16, when the clevis pin 218 is secured in the closed position, the base 240 extends into the base aperture 244 which similarly provides a visual indication that the clevis pin 218 is secured in a closed position by positioning the spring block 224 proximate to the second leg 250.

Figure 18:
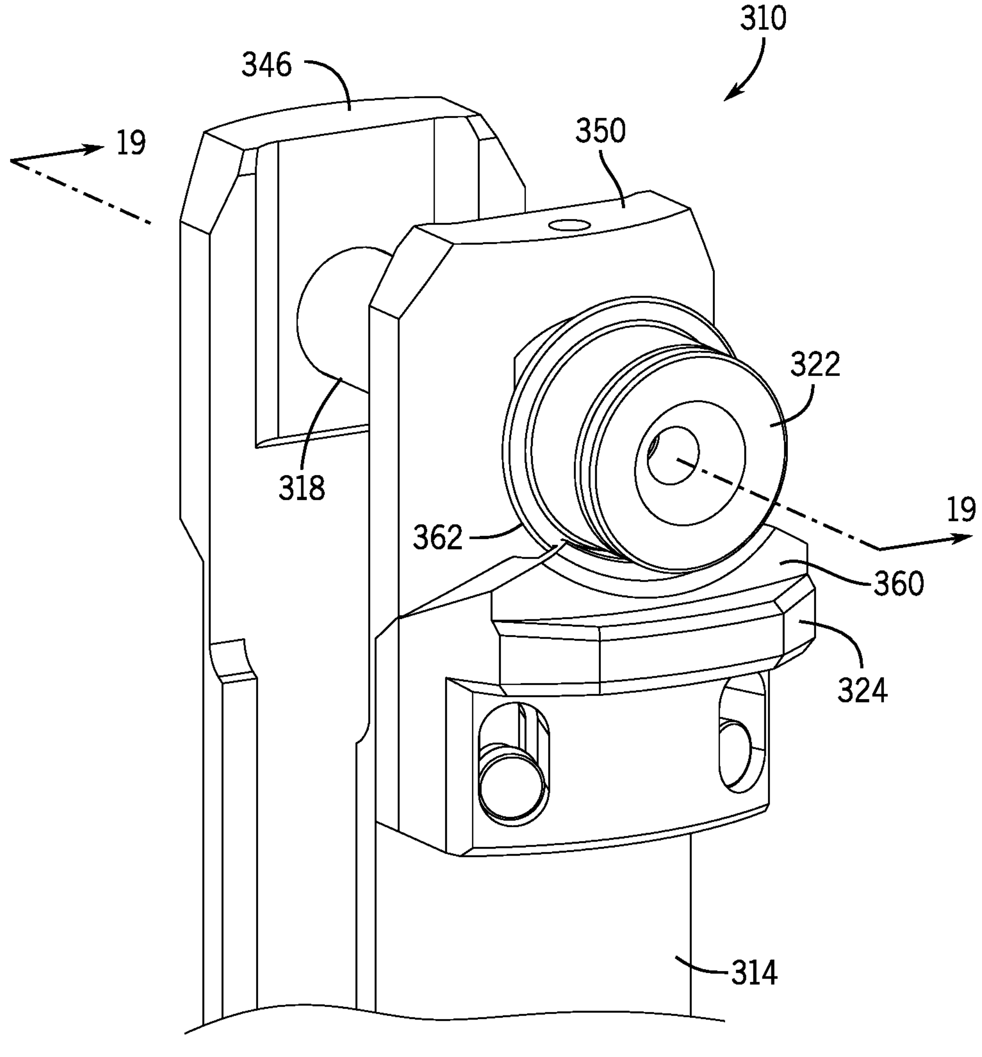
FIG. 18 is an isometric partial view of a clevis pin arrangement including an actuation block according to another embodiment of the invention.
Figure 19:
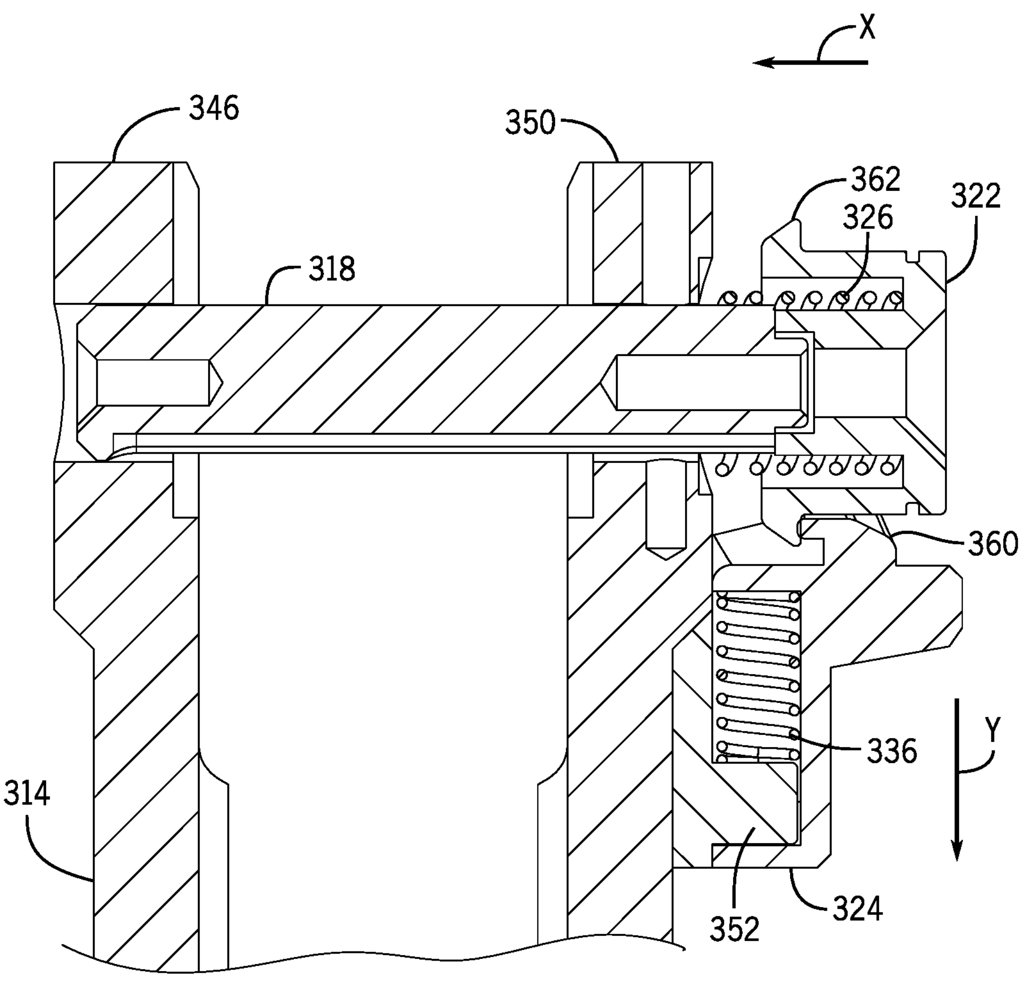
FIG. 19 is a cross-sectional partial side view of the clevis pin arrangement taken through 19-19 of FIG. 18.

FIGS. 18 and 19 illustrate a clevis pin arrangement 310 according to another embodiment of the invention. The clevis pin arrangement 310 includes a clevis 314, a clevis pin 318, and a lock knob 322 that is secured to the clevis pin 318. The clevis pin arrangement 310 further includes an actuation block 324 secured to a second leg 350 of the clevis 314 and is slidable relative to the second leg 350 in the direction Y shown in FIG. 19. The clevis pin arrangement 310 further includes a first spring 326 within the lock knob 322 that urges the lock knob 322 away from the second leg 250. A second spring 336 within the actuation block 324 biases the actuation block 324 generally upward. The second spring 336 is positioned between a support ledge 352 that extends outward from the second leg 350 and the actuation block 324.

As shown in FIG. 19, the actuation block 324 includes a first catch 360 that can engage a second catch 362 on the lock knob 322. Each of the first catch 360 and the second catch 362 have generally C-shaped profiles; however, other configurations are possible. For example, each of the lock knob 322 and the actuation block 324 can include first and second catches having an L-shaped profile, or other suitable protrusion/notch combinations.

In use, the clevis pin arrangement 310 may be moved from the closed position shown in FIG. 19 to an open position by urging the lock knob 322 toward the second leg 350 in the direction X, thereby disengaging the first catch 360 and the second catch 362. The actuation block 324 may then be moved downward relative to the second leg 350 in the direction Y. From there, the lock knob 322 may be moved away from the second leg 350, thereby moving the clevis pin 318 axially away from a first leg 346 of the clevis 314. Correspondingly, the clevis pin arrangement 310 may be moved from an open position to the closed position by moving the actuation block 324 downward relative to the second leg 350 in the direction Y shown in FIG. 19, moving the lock knob 322, and thereby the clevis pin 318, toward the second leg 350 in the direction X, and releasing the actuation block 324 and the lock knob 322 so that the first catch 360 and the second catch 362 reengage, as shown in FIG. 19.

Figure 20:
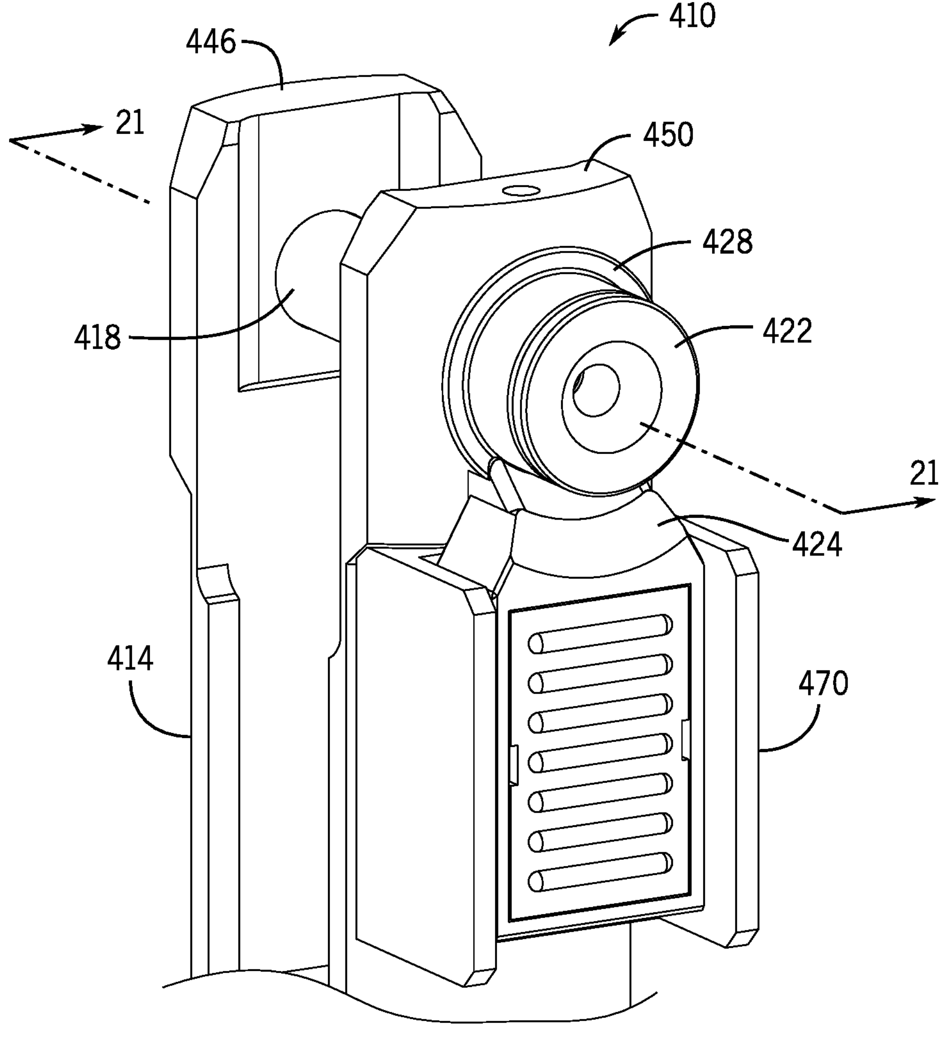
FIG. 20 is an isometric partial view of a clevis pin arrangement including a latch and guard according to another embodiment of the invention.
Figure 21:
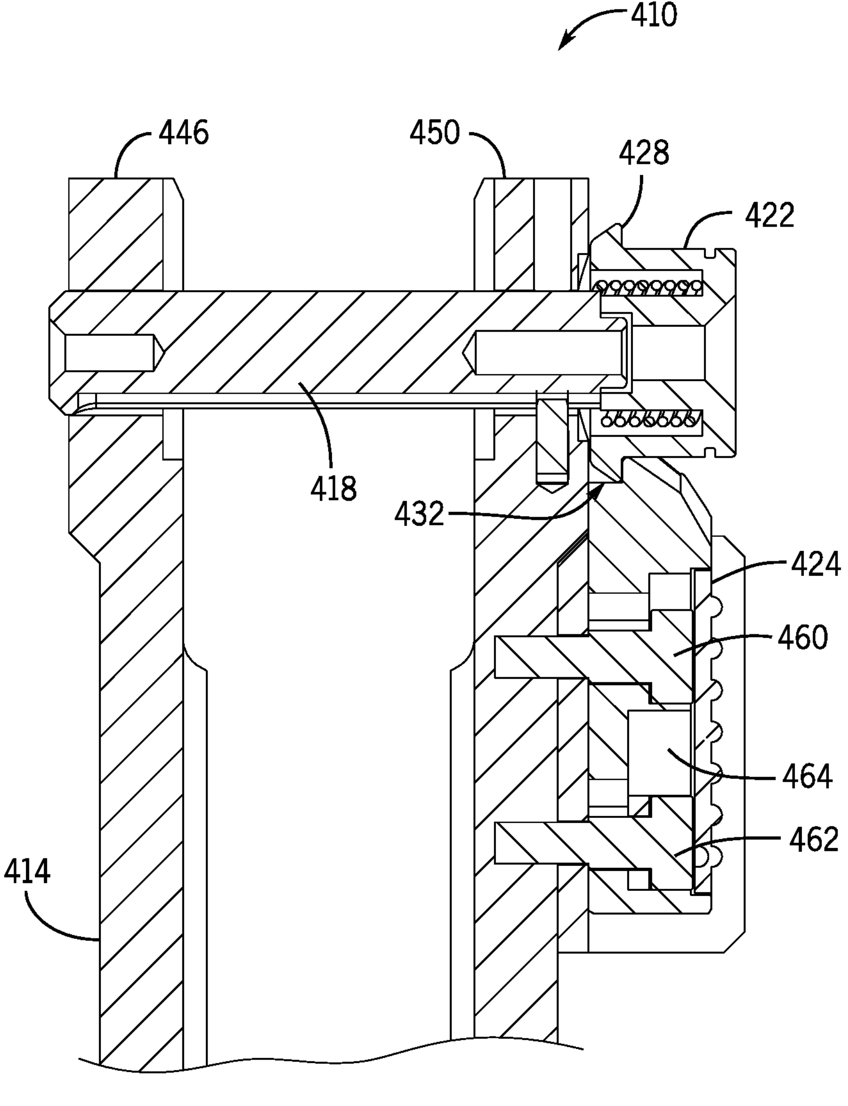
FIG. 21 is a cross-sectional partial side view of the clevis pin arrangement taken through 21-21 of FIG. 20.

FIGS. 20 and 21 illustrate a clevis pin arrangement 410 according to another embodiment of the invention. The clevis pin arrangement 410 includes a clevis 414, a clevis pin 418, and a lock knob 422 that is secured to the clevis pin 418. The clevis pin arrangement 410 further includes an actuation block 424 that is secured to a second leg 450 of the clevis 414 and is slidable relative to the second leg 450. The lock knob 422 includes an annular ridge 428 and the actuation block 424 includes a corresponding recess 432, as shown in FIG. 21, that is dimensioned to engage the annular ridge 428. The actuation block 424 includes a first fastener 460 and a second fastener 462 which slidably secure the actuation block 424 to the second leg 450. The actuation block 424 further includes a spring 464 that is positioned between the second fastener 462 and the actuation block 424. The spring 464 biases the actuation block 424 upward so that the recess 432 engages the annular ridge 428. The recess 432 is then engaged with the annular ridge 428, so that the lock knob 422 and the clevis pin 418 are secured in place in the closed position.

As shown in FIG. 20, the clevis pin arrangement 410 further includes guards 470 that surround lateral sides of the actuation block 424. The guards 470 are configured to mitigate unintentional activation of the actuation block 424. In use, the actuation block 424 may be urged downward relative to the second leg 450, thereby disengaging the annular ridge 428 and the recess 432. Once disengaged, the lock knob 422, may be moved away from the second leg 450, thereby moving the clevis pin 418 axially away from a first leg 446 of the clevis 414 and moving the clevis pin 418 from a closed position to an open position. Correspondingly, the clevis pin arrangement 410 may be moved from the open position to the closed position by moving the actuation block 424 downward relative to the second leg 450, and moving the lock knob 422 toward the second leg 450. When the clevis pin 418 engages an aperture of the first leg 446, the actuation block 424 may be released, so that the recess 432 reengages the annular ridge 428.

Figure 22:
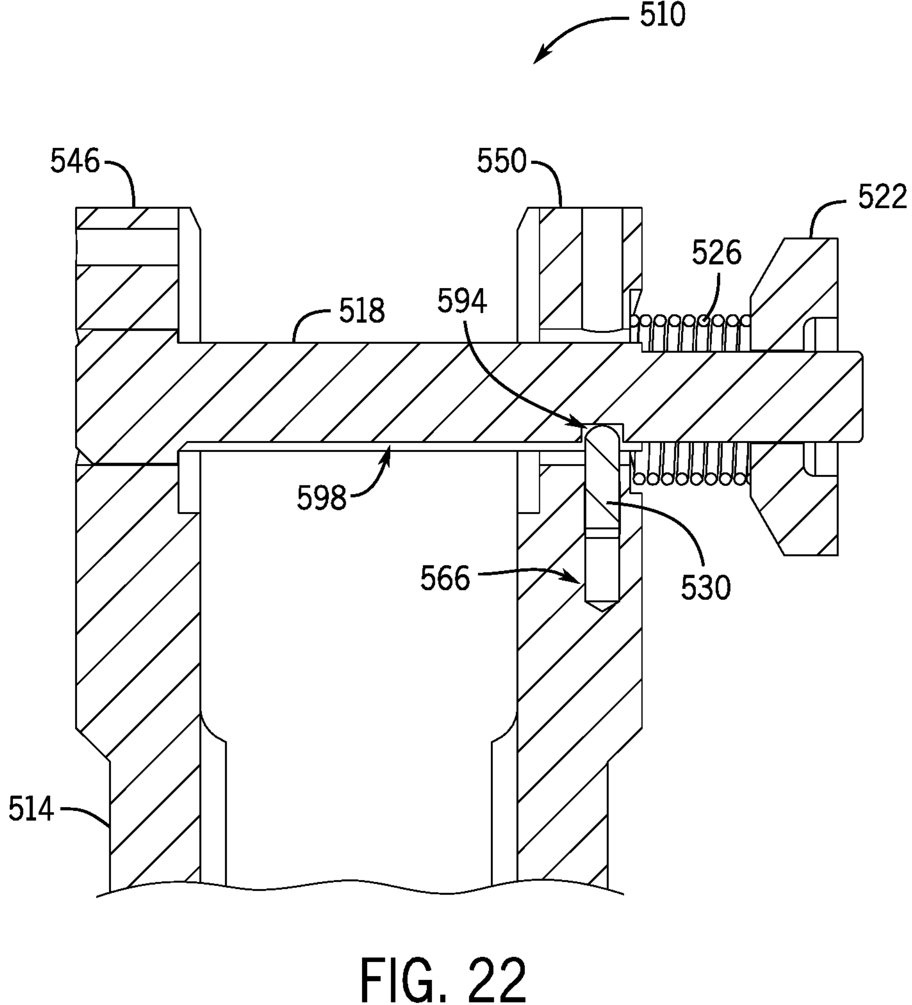
FIG. 22 is a cross-sectional partial side view of a clevis pin arrangement including a spring and detent held pin according to another embodiment of the invention.

FIG. 22 illustrates a clevis pin arrangement 510 according to another embodiment of the invention. The clevis pin arrangement 510 includes a clevis 514, a clevis pin 518, and an actuation knob configured as a lock knob 522 that is secured to the clevis pin 518. The clevis pin arrangement 510 further includes a spring 526 that biases the lock knob 522 away from a second leg 550 and a stop pin 530 secured in a stop pin aperture 566 of the second leg 550. In the closed position, the spring 526 is compressed between the lock knob 522 and the second leg 550. The clevis pin 518 includes a stop pin recess 594 and a stop slot 598.

In the closed position, the stop pin 530 engages the stop pin recess 594 of the clevis pin 518. In use, the lock knob 522 can be rotated, thereby rotating the clevis pin 518, so that the stop pin 530 enters the stop slot 598 via a transition chamfer (not shown), which corresponds to an intermediate position where the clevis pin arrangement 510 is neither open nor closed. To move the clevis pin 518 to the open position, the lock knob 522 may be moved away from the second leg 550, thereby moving the clevis pin 518 axially away from a first leg 546 of the clevis 514. In some embodiments, the lock knob 522 may be moved away from the second leg 550 via the biasing force of the spring 526. Correspondingly, the clevis pin arrangement 510 may be moved from an open position to a closed position by moving the lock knob 522 toward the second leg 550, and rotating the lock knob 522 until the stop pin is secured in the stop pin recess 594, as shown in FIG. 22.

Figure 23:
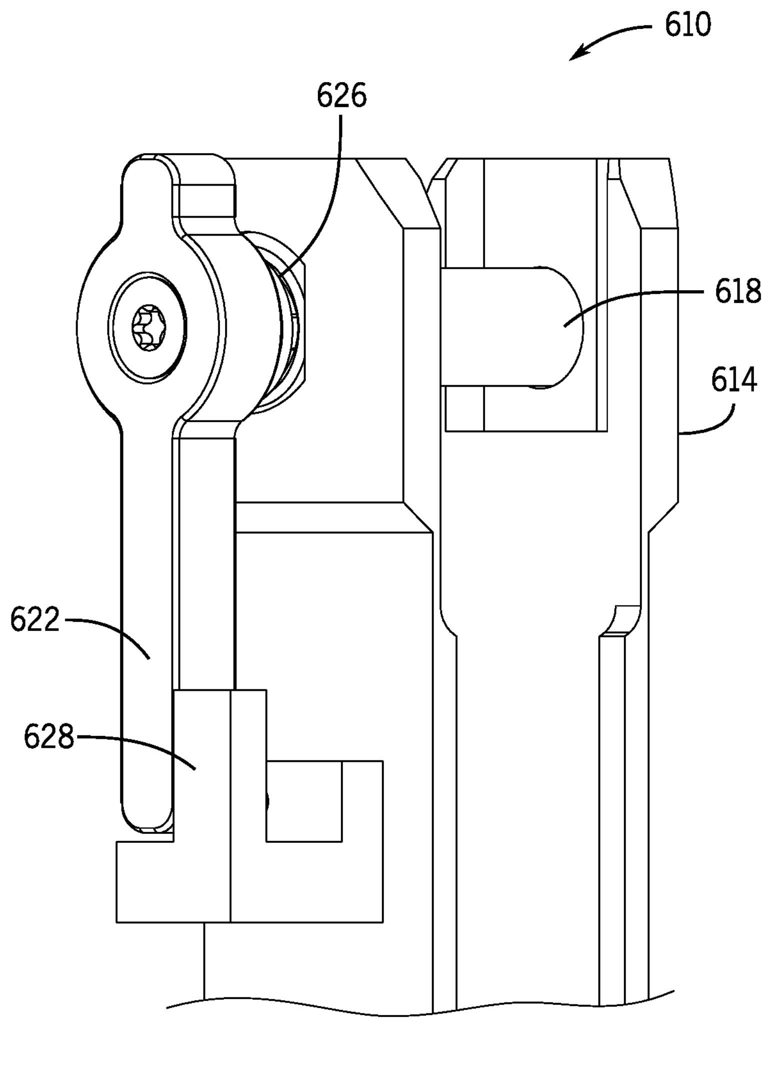
FIG. 23 is an isometric partial view of a clevis pin arrangement including a lever arm and locking block according to another embodiment of the invention.

FIG. 23 illustrates a clevis pin arrangement 610 according to another embodiment of the invention. The clevis pin arrangement 610 includes a clevis 614, a clevis pin 618, a clevis lever 622 that acts as an actuator and is secured to the clevis pin 618, and a spring 626 that biases the clevis lever 622 toward a closed position. The clevis pin arrangement 610 operates substantially similarly to the clevis pin arrangement 10 so that the clevis lever 622 is configured to rotate the clevis pin 618 to move a stop pin (not shown) in and out of engagement with a stop pin recess of the clevis pin 618. The clevis pin arrangement 610 further includes a stop block 628 that can engage the clevis lever 622 when in the closed position and prevents rotation in a direction. The clevis pin arrangement 610 can be moved between the closed position and an open position via the clevis lever 622 similar to the rotation of the clevis lever 22 of the clevis pin arrangement 10.

Figure 24:
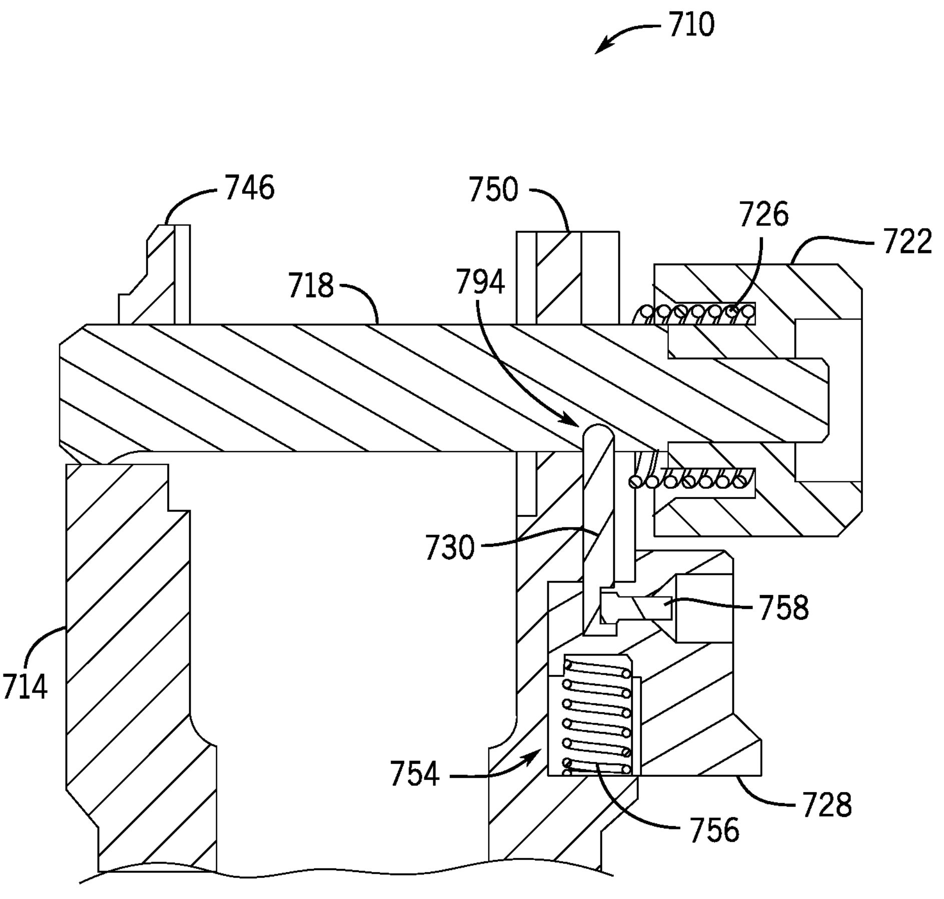
FIG. 24 is a cross-sectional partial side view of a clevis pin arrangement including a locking pin fixed to an actuation block according to another embodiment of the invention.

FIG. 24 illustrates a clevis pin arrangement 710 according to another embodiment of the invention. The clevis pin arrangement 710 includes a clevis 714, a clevis pin 718, and a lock knob 722 that is secured to the clevis pin 718. The clevis pin arrangement 710 further includes a spring 726 that biases the lock knob 722 away from a second leg 750, an actuation block 728, and a stop pin 730 that engages a stop pin recess 794 in the clevis pin 718. The actuation block 728 is received within a recess 754 of the second leg 750. A second spring 756 is positioned between a ledge of the recess 754 and the actuation block 728 to bias the actuation block 728 upwards. As further illustrated, the stop pin 730 is secured to the actuation block 728 via a fastener 758, so that when the actuation block 728 is moved downward against the force of the second spring 756, the stop pin 730 is simultaneously moved downward.

In use, the actuation block 728 may be moved downward relative to the second leg 750, thereby disengaging the stop pin 730 from the stop pin recess 794. Once disengaged, the lock knob 722 may be moved away from the second leg 750, thereby moving the clevis pin 718 axially away from a first leg 746 of the clevis 714 and moving the clevis pin 718 from the closed position to an open position. Correspondingly, the clevis pin arrangement 710 may be moved from the open position to the closed position by moving the actuation block 728 downward relative to the second leg 750, moving the lock knob 722 toward the second leg 750, and releasing the actuation block 728 so that the second spring 756 urges the stop pin 730 into engagement with the stop pin recess 794.

Figure 25:
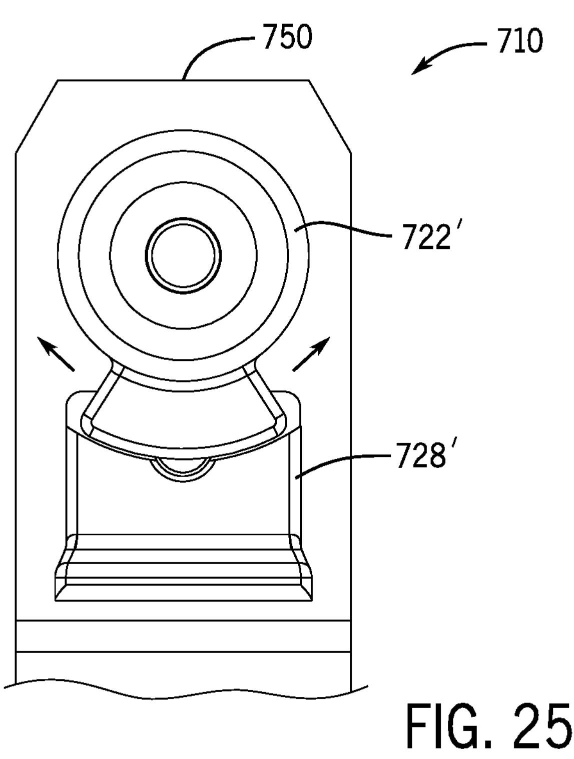
FIG. 25 is a partial side view of a clevis pin arrangement including a locking pin fixed to an actuation block that includes a lock channel according to another embodiment of the invention.
Figure 26:
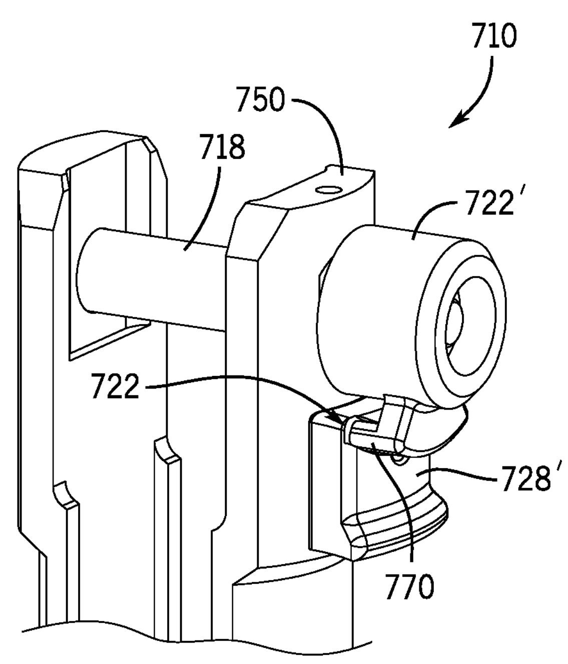
FIG. 26 is an isometric partial view of the clevis pin arrangement of FIG. 25.

FIGS. 25 and 26 illustrate an additional configuration of the clevis pin arrangement 710 where a lock knob 722' can further include a protrusion 770 (see, for example, FIG. 26). Correspondingly, an actuation block 728' can include a recess 772 dimensioned to receive the protrusion 770. In use, the lock knob 722' may require rotation to disengage the protrusion 770 from the recess 772 before the actuation block 728' can be moved downward and the clevis pin arrangement 710 can be moved from the closed position to the open position. In some embodiments, the lock knob 722 may be rotated clockwise or counterclockwise to remove the protrusion 770 from the recess. The clevis pin arrangement 710 can then be moved from a locked position to an unlocked position similar to the embodiments described above.

Figure 27:
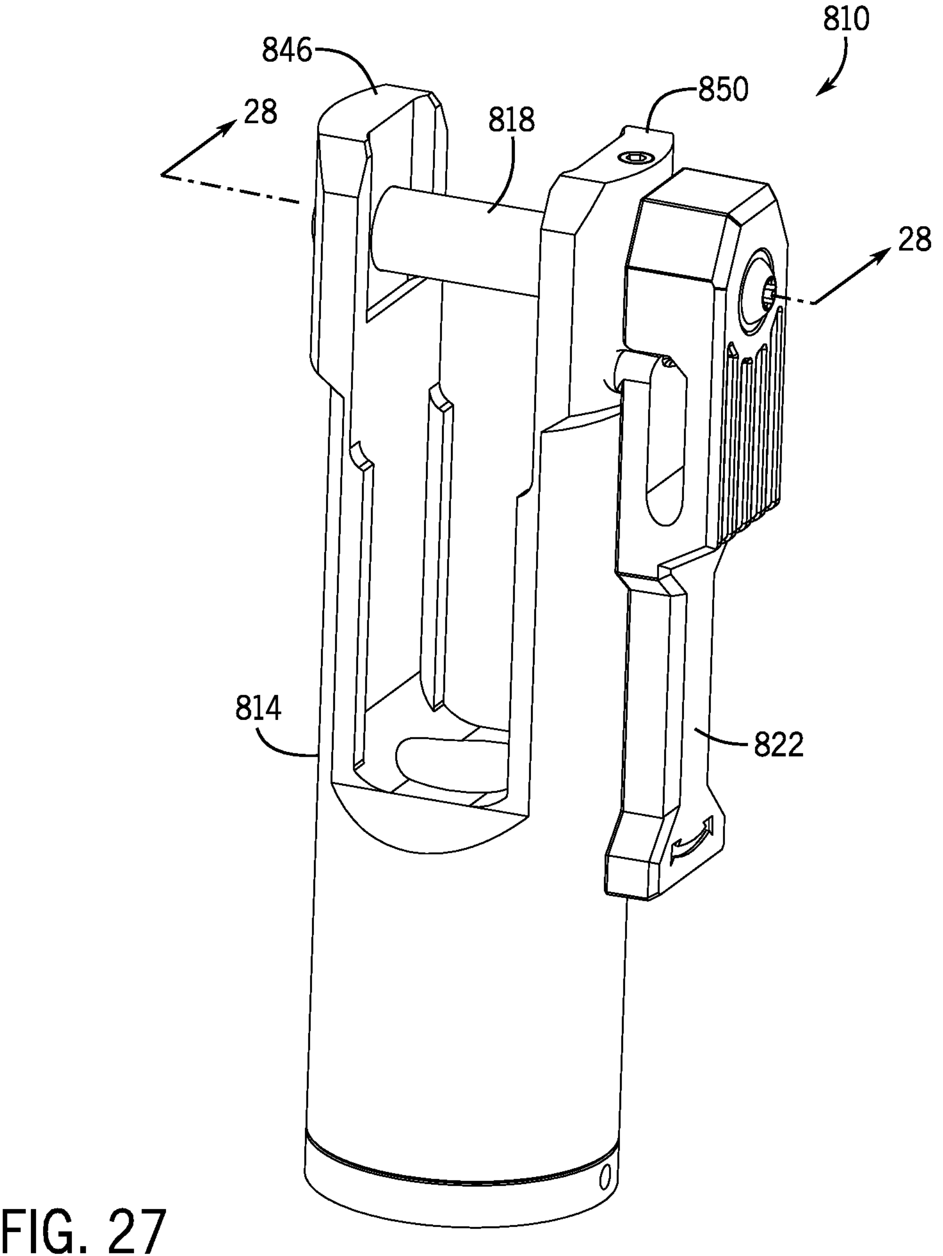
FIG. 27 is an isometric view of a clevis pin arrangement including first and second clevis pins according to another embodiment of the invention.
Figure 28:
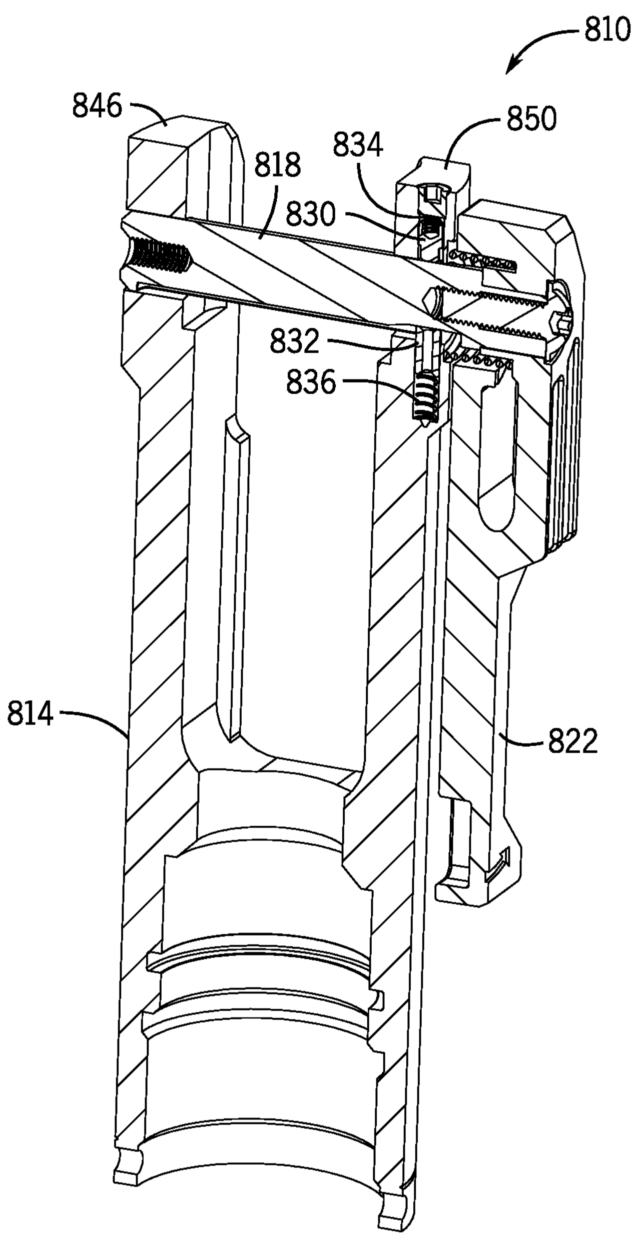
FIG. 28 is a cross-sectional isometric view of the clevis pin arrangement of FIG. 27.
Figure 29:
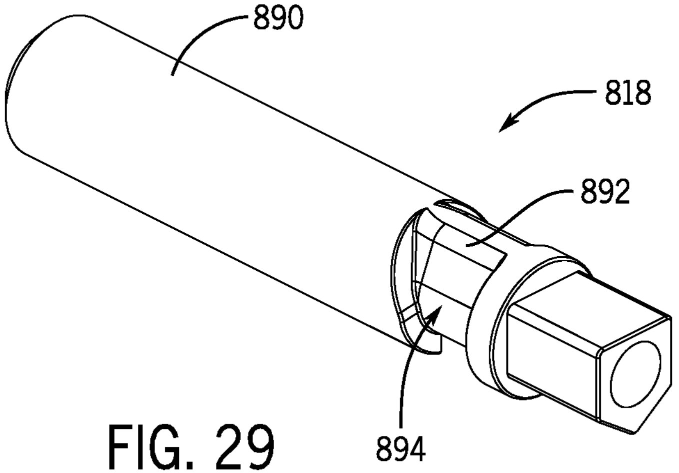
FIG. 29 is an isometric top view of the clevis pin of FIG. 27.

FIGS. 27-29 illustrate a clevis pin arrangement 810 according to another embodiment of the invention. The clevis pin arrangement 810 includes a clevis 814, a clevis pin 818, and a clevis lever 822 that is secured to the clevis pin 818, similar to the clevis lever 22 of the clevis pin arrangement 10. In general, the clevis lever 822 can be rotated in a substantially similar method as the clevis lever 22 described above to move the clevis pin arrangement 810 between a locked orientation (shown in FIGS. 27 and 28) and an unlocked orientation. As shown in FIG. 28, the clevis pin 818 can be secured in a locked position via a first stop pin 830 and a second stop pin 832. The clevis pin arrangement 810 also includes first and second springs 834, 836 that bias the respective first and second stop pins 830, 832 toward the clevis pin 818.

Figure 30:
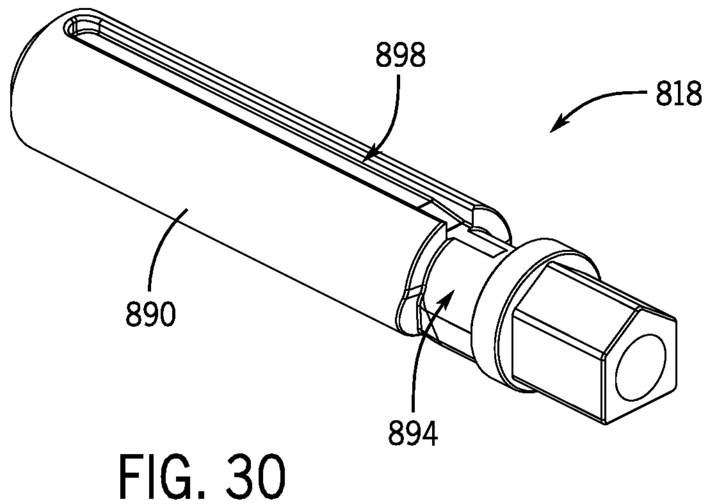
FIG. 30 is an isometric bottom view of the clevis pin of FIG. 27.

FIGS. 29 and 30 illustrate the clevis pin 818. Similar to the clevis pin 18, the clevis pin 818 defines a body 890 and includes a stop pin recess 894 and a stop slot 898 that extends along an intermediate portion of the clevis pin 818.

In use, the clevis pin 818 can be rotated, via the clevis lever 822, from the locked position (shown in FIG. 29) to the unlocked position (shown in FIG. 30). As the clevis pin 818 is rotated (e.g., 180 degrees from the locked position to the unlocked position), the first and second stop pins 830, 832 can travel within the stop pin recess 894. Once the clevis pin 818 has rotationally reached the unlocked position, the first stop pin 830 can travel along the stop slot 898 and the second stop pin 832 can travel along the body 890 of the clevis pin 818 so that the clevis pin 818 can be removed from between the first and second clevis legs 846, 850.

In the illustrated embodiment, the first stop pin 830 has a smaller diameter than the second stop pin 832. The diameter of the second stop pin 832 prevents the second stop pin 832 from entering the stop slot 898 of the clevis pin 818 and therefore prevents the clevis pin 818 from being removed from the clevis 814 when the clevis lever 822 is in the locked orientation. When the clevis pin 818 is rotated from the locked orientation to the unlocked orientation, the second stop pin 832 can be moved from the stop pin recess 894 to the outer body of the clevis pin 818 via a ramped portion 892 of the clevis pin 818. As the second stop pin 832 is moved along the ramped portion 892, the second spring 836 is compressed and the second stop pin 832 is allowed to travel along the body 890 of the clevis pin 818.

Figure 31:
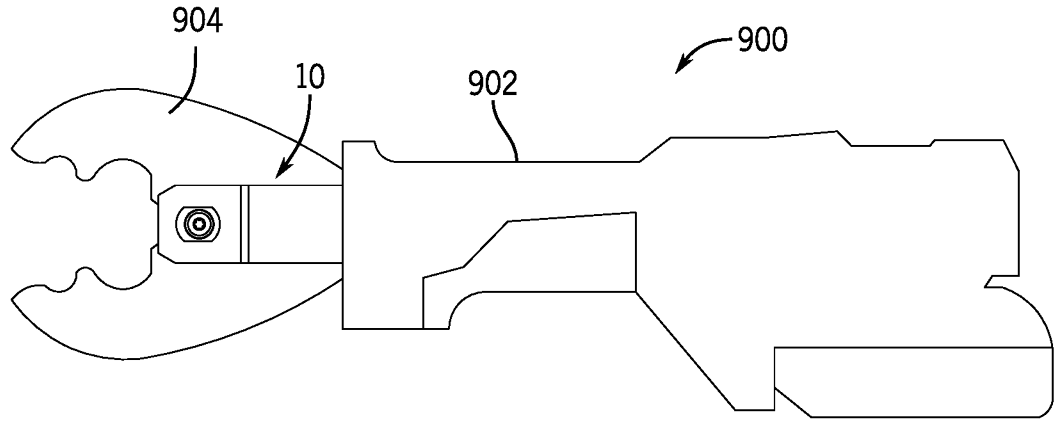
FIG. 31 is a side view of a crimper tool that includes the clevis pin arrangement of FIG. 1 in the closed position.
Figure 32:
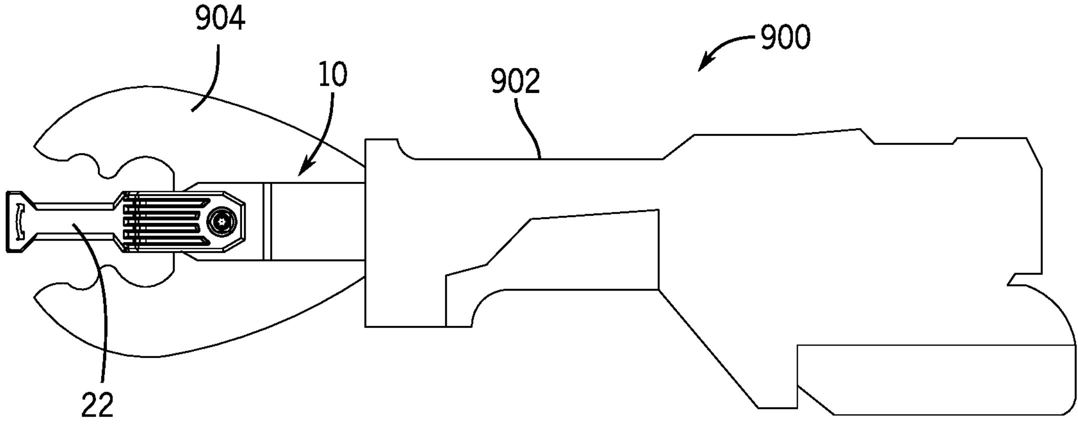
FIG. 32 is a side view of the crimper tool of FIG. 31 that includes the clevis pin arrangement of FIG. 1 in the open position.

FIGS. 31 and 32 illustrate an example of a crimper tool 900. The crimper tool includes a body 902 and jaws 904 that are secured to the body 902 via a clevis pin arrangement. In particular, FIG. 31 illustrates the jaws 904 secured to the body 902 via the clevis pin arrangement 10 in the closed position. However, it should be appreciated that the jaws 904 may be secured to the body 902 via any clevis pin arrangement according to the invention, including the clevis pin arrangements 210, 310, 410, 510, 610, 710, and 810 or combinations thereof. FIG. 32 illustrates the clevis pin arrangement 10 in an open position where the lever body 110 extends about 180 degrees from the closed position. Additionally, the lever body 110 obstructs the opening of the jaws 904, thereby blocking the use of the crimper tool 900 when the jaws are being changed.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

The invention claimed is:

1. A clevis pin arrangement for use in a tool, the clevis pin arrangement comprising:

a clevis with a first leg having a first aperture and a second leg having a second aperture;

a clevis pin moveable between a locked orientation and an unlocked orientation, the clevis pin having a first end, an intermediate portion including a stop slot that extends along the intermediate portion between the first end and a second end of the clevis pin, the first end extending into the first aperture and the intermediate portion extending through the second aperture while the clevis pin arrangement is in a closed position, the first end configured to be removed from the first aperture while in the unlocked orientation to provide an open position of the clevis pin arrangement;

a stop pin disposed within the second aperture;

a stop pin recess disposed in the clevis pin and configured to engage the stop pin, the stop pin recess extending entirely around the clevis pin; and an actuator configured to move relative to the clevis to selectively engage and disengage the stop pin with the stop pin recess and move the clevis pin arrangement between the locked orientation and the unlocked orientation, the stop pin disposed in the stop pin recess and positioned opposite the stop slot when the clevis pin is in the locked orientation.

2. The clevis pin arrangement of claim 1, wherein the actuator includes a clevis lever coupled to the clevis pin and engaging a spring, the clevis lever including a drive aperture receiving the second end of the clevis pin, a lever body, and an inner surface, the inner surface including a first detent and a second detent.

3. The clevis pin arrangement of claim 1, wherein the actuator includes a lock knob that is configured to be moved laterally away from the clevis in the open position.

4. The clevis pin arrangement of claim 1, further comprising a spring configured to bias the actuator away from the clevis in the open position.

5. The clevis pin arrangement of claim 1, wherein the actuator includes an actuation block configured to move radially away from the clevis pin to unlock the clevis pin and disengage the stop pin from the stop pin recess.

6. The clevis pin arrangement of claim 1, wherein the stop slot is configured to receive the stop pin in the open position.

7. The clevis pin arrangement of claim 6, wherein the stop pin recess is configured as an annular recess that includes a transition chamfer, the transition chamfer configured to guide the stop pin from the stop pin recess to the stop slot.

8. A clevis pin arrangement for use in a tool, the clevis pin arrangement comprising:

a clevis with a first leg having a first aperture and a second leg having a second aperture, the clevis including a stop pin aperture and a stop pin positioned in the stop pin aperture;

a clevis pin having a first end, an intermediate portion, and a second end, the first end extending into the first aperture and the intermediate portion extending into the second aperture while in a closed position, the first end being removed from the first aperture while in an open position, the second end including a stop pin recess; and a clevis lever coupled to the clevis pin and engaging a spring, the clevis lever including a drive aperture receiving the second end of the clevis pin, a lever body, and an inner surface, the inner surface including a first detent and a second detent that engage the second leg in a closed position, the first detent disengaged from the second leg and the second detent engaged with the second leg in an intermediate position, rotation of the lever body causing the first detent to decompress away from the second leg and move the stop pin within the stop pin recess into the intermediate position, further rotation of the lever body causing the second detent to decompress away from the second leg and pull the clevis pin out of the first aperture into the open position, the lever body rotatable in both a first rotational direction and a second rotational direction that is opposite the first rotational direction to cause the stop pin to move from the closed position to the open position.

9. The clevis pin arrangement of claim 8, wherein the lever body in the open position extends about 180 degrees from the closed position.

10. The clevis pin arrangement of claim 9, further comprising:

a first jaw and a second jaw coupled to the clevis pin, wherein the lever body in the open position blocks use of the first jaw and the second jaw and allows the first jaw and the second jaw to be removed from the first end of the clevis pin.

11. The clevis pin arrangement of claim 8, wherein at least one of the first detent or the second detent is constructed of a polymer.

12. The clevis pin arrangement of claim 8, wherein the second end of the clevis pin includes a substantially square drive and the drive aperture of the clevis lever includes a substantially square shape.

13. The clevis pin arrangement of claim 8, wherein the clevis pin includes a stop slot extending along at least a portion of its length.

14. The clevis pin arrangement of claim 8, wherein the stop pin recess is configured as an annular recess that includes a transition chamfer, the stop pin engaging the transition chamfer as the lever body is initially rotated.

* * * * *